US011910325B2

(12) United States Patent
Ang et al.

(10) Patent No.: US 11,910,325 B2
(45) Date of Patent: Feb. 20, 2024

(54) LOW POWER SCHEDULING

(71) Applicant: QUALCOMM Incorporated, San Diego, CA (US)

(72) Inventors: Peter Pui Lok Ang, San Diego, CA (US); Tingfang Ji, San Diego, CA (US); Jing Jiang, San Diego, CA (US); Krishna Kiran Mukkavilli, San Diego, CA (US); Joseph Binamira Soriaga, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 16/510,763

(22) Filed: Jul. 12, 2019

(65) Prior Publication Data
US 2019/0342836 A1   Nov. 7, 2019

Related U.S. Application Data

(63) Continuation of application No. 14/927,174, filed on Oct. 29, 2015, now Pat. No. 10,405,278.
(Continued)

(51) Int. Cl.
*H04W 52/02* (2009.01)
*H04L 1/18* (2023.01)
(Continued)

(52) U.S. Cl.
CPC ...... *H04W 52/0258* (2013.01); *H04B 7/0413* (2013.01); *H04L 1/1812* (2013.01);
(Continued)

(58) Field of Classification Search
None
See application file for complete search history.

(56) References Cited

U.S. PATENT DOCUMENTS 6,487,425 B1    11/2002    Thakker et al.
7,512,716 B2 *  3/2009    Pelletier .................. H04L 69/04
                                                                    709/236
(Continued)

FOREIGN PATENT DOCUMENTS

CN    1703044 A    11/2005
CN    103490850 A    1/2014
(Continued)

OTHER PUBLICATIONS

European Search Report—EP18198692—Search Authority—The Hague—dated Nov. 23, 2018.
(Continued)

*Primary Examiner* — Steve R Young
(74) *Attorney, Agent, or Firm* — Loza & Loza, LLP

(57) ABSTRACT

The disclosure relates in some aspects to an energy-aware architecture that supports a low power scheduling mode. For example, a media access control (MAC) architecture for a base station (e.g., an enhanced Node B) and associated access terminals (e.g., UEs) can take the power needs of the access terminals into account when scheduling the access terminals. In some aspects, an access terminal may support a particular frame structure for a low power mode. Accordingly, scheduling of the access terminal may include use of the particular frame structure during low power mode.

38 Claims, 13 Drawing Sheets

Related U.S. Application Data

(60) Provisional application No. 62/073,520, filed on Oct. 31, 2014.

(51) Int. Cl.

| | | |
|---|---|---|
| *H04W 76/28* | (2018.01) | |
| *H04W 72/04* | (2023.01) | |
| *H04B 7/0413* | (2017.01) | |
| *H04W 72/044* | (2023.01) | |
| *H04W 72/0446* | (2023.01) | |
| *H04L 1/1812* | (2023.01) | |

(52) U.S. Cl.
CPC ... *H04W 52/0216* (2013.01); *H04W 52/0229* (2013.01); *H04W 72/0446* (2013.01); *H04W 72/0473* (2013.01); *H04W 76/28* (2018.02); *Y02D 30/70* (2020.08)

(56) References Cited

U.S. PATENT DOCUMENTS

| | | | |
|---|---|---|---|
| 7,583,984 | B2 | 9/2009 | Sun et al. |
| 8,625,601 | B2 | 1/2014 | Gholmieh et al. |
| 9,253,729 | B1 | 2/2016 | Sundar et al. |
| 9,288,032 | B2 | 3/2016 | Wei et al. |
| 2003/0152059 | A1* | 8/2003 | Odman ............ H04B 1/69 370/468 |
| 2005/0096102 | A1 | 5/2005 | Mock et al. |
| 2007/0037548 | A1* | 2/2007 | Sammour ......... H04W 52/0235 455/343.2 |
| 2007/0253507 | A1 | 11/2007 | Zhou et al. |
| 2007/0275746 | A1 | 11/2007 | Bitran |
| 2008/0043656 | A1* | 2/2008 | Yoon .............. G06F 1/3209 370/311 |
| 2008/0049250 | A1* | 2/2008 | Sugishita ........... H04N 1/00885 358/1.15 |
| 2008/0248768 | A1* | 10/2008 | Doi .................. H04W 52/0245 455/127.5 |
| 2008/0294919 | A1* | 11/2008 | Lida ................. H04L 25/4917 713/320 |
| 2010/0034219 | A1 | 2/2010 | Stadelmeier et al. |
| 2010/0166048 | A1* | 7/2010 | Young ............... H04B 1/04 375/220 |
| 2010/0173651 | A1 | 7/2010 | Park et al. |
| 2011/0128865 | A1 | 6/2011 | Doppler et al. |
| 2011/0199985 | A1* | 8/2011 | Cai .................. H04L 27/0012 370/329 |
| 2011/0211503 | A1 | 9/2011 | Che et al. |
| 2011/0225440 | A1* | 9/2011 | Kwon ............. H04W 52/0225 455/127.5 |
| 2012/0184316 | A1 | 7/2012 | Ode |
| 2012/0213154 | A1* | 8/2012 | Gaal ............... H04B 7/061 370/328 |
| 2012/0329407 | A1 | 12/2012 | Rousu et al. |
| 2013/0044791 | A1 | 2/2013 | Rimini et al. |
| 2013/0064119 | A1 | 3/2013 | Montojo et al. |
| 2013/0107727 | A1 | 5/2013 | Lunden et al. |
| 2013/0121147 | A1 | 5/2013 | Tapia et al. |
| 2013/0176879 | A1 | 7/2013 | Tian et al. |
| 2013/0215809 | A1* | 8/2013 | Chang ............ H04W 76/28 370/311 |
| 2013/0242824 | A1 | 9/2013 | Lee et al. |
| 2014/0018085 | A1* | 1/2014 | Young ............. H04W 76/27 455/450 |
| 2014/0064164 | A1 | 3/2014 | Nagaraj et al. |
| 2014/0112224 | A1 | 4/2014 | Jafarian et al. |
| 2014/0248915 | A1 | 9/2014 | Chandramouli et al. |
| 2014/0254452 | A1* | 9/2014 | Golitschek Edler Von Elbwart ........... H04W 52/0219 370/311 |
| 2014/0313963 | A1 | 10/2014 | Aust et al. |
| 2015/0124671 | A1 | 5/2015 | Tabet et al. |
| 2015/0201326 | A1 | 7/2015 | Kazmi et al. |
| 2015/0208420 | A1 | 7/2015 | Kashiwase et al. |
| 2015/0281981 | A1 | 10/2015 | Msallem et al. |
| 2015/0282069 | A1 | 10/2015 | Hobbs et al. |
| 2015/0319700 | A1 | 11/2015 | Oteri et al. |
| 2015/0351036 | A1 | 12/2015 | Vaidya et al. |
| 2016/0007283 | A1 | 1/2016 | Trainin |
| 2016/0073284 | A1 | 3/2016 | Qian et al. |
| 2016/0127997 | A1 | 5/2016 | Ang et al. |
| 2016/0192433 | A1* | 6/2016 | Deenoo ............ H04W 76/28 370/329 |
| 2017/0295585 | A1 | 10/2017 | Sorrentino et al. |
| 2022/0217639 | A1 | 7/2022 | Ang et al. |

FOREIGN PATENT DOCUMENTS

| | | |
|---|---|---|
| JP | 2006518125 A | 8/2006 |
| JP | 2011109252 A | 6/2011 |
| JP | 2013520102 A | 5/2013 |
| JP | 2013115466 A | 6/2013 |
| JP | 2013192010 A | 9/2013 |
| WO | 2008022329 A2 | 2/2008 |
| WO | 2011039821 A1 | 4/2011 |
| WO | 2014045016 A1 | 3/2014 |

OTHER PUBLICATIONS

International Search Report and Written Opinion—PCT/US2015/058252 ISA/EPO—dated Apr. 4, 2016.
Partial International Search Report—PCT/US2015/058252—ISA/EPO—dated Jan. 27, 2016.

* cited by examiner

LOW POWER SCHEDULING

CROSS-REFERENCE TO RELATED APPLICATION(S)

This application is a continuation of patent application Ser. No. 14/927,174 filed in the U.S. Patent and Trademark Office on Oct. 29, 2015, which claims priority to and the benefit of provisional patent application No. 62/073,520 filed in the U.S. Patent and Trademark Office on Oct. 31, 2014, the entire content of each of which is incorporated herein by reference.

BACKGROUND

Field of the Disclosure

Aspects of the disclosure relate generally to wireless communication, and more specifically, but not exclusively, to scheduling for a low power mode.

Description of Related Art

Wireless communication networks are widely deployed to provide various communication services such as telephony, video, data, messaging, broadcasts, and so on. Such networks, which are usually multiple access networks, support communication for multiple users by sharing the available network resources.

As the demand for mobile broadband access continues to increase, research and development continue to advance wireless communication technologies not only to meet the growing demand for mobile broadband access, but to advance and enhance the user experience. For example, it is desirable to reduce the power consumption of mobile devices. Reduced power consumption leads to longer battery life, which is an important factor affecting user (e.g., smart phone user) experience.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a method of communication, comprising: sending an indication that an access terminal supports a selection of different ones of a plurality of power modes; sending an indication that, for a first power mode of the plurality of power modes, the access terminal supports one or more of: dynamic switching between reduced hybrid automatic repeat request, H-ARQ, signaling and normal H-ARQ signaling; or dynamic switching between low power discontinuous reception, DRX, and normal DRX; sending or receiving a request for the access terminal to switch to the first power mode; and transitioning to the first power mode as a result of the sending or receiving of the request.

Another aspect of the disclosure provides an apparatus configured for communication that includes a memory device and a processing circuit coupled to the memory device. The processing circuit is configured to: send an indication that an access terminal supports a selection of different ones of a plurality of power modes; send an indication that, for a first power mode of the plurality of power modes, the access terminal supports one or more of: dynamic switching between reduced hybrid automatic repeat request, H-ARQ, signaling and normal H-ARQ signaling; or dynamic switching between low power discontinuous reception, DRX, and normal DRX; send or receive a request for the access terminal to switch to the first power mode; and transition to the first power mode as a result of the sending or receiving of the request.

Another aspect of the disclosure provides a method of communication, comprising: receiving an indication that an access terminal supports a selection of different ones of a plurality of power modes; receiving an indication that, for a first power mode of the plurality of power modes, the access terminal supports one or more of: a frame structure; dynamic switching between reduced hybrid automatic repeat request, H-ARQ, signaling and normal H-ARQ signaling; or dynamic switching between low power discontinuous reception, DRX, and normal DRX; determining whether the access terminal is to transition to the first power mode; and communicating a request for the access terminal to switch to the first power mode.

In one aspect, the disclosure provides an apparatus configured for communication that includes a memory device and a processing circuit coupled to the memory device. The processing circuit is configured to: receive an indication that an access terminal supports a selection of different ones of a plurality of power modes; receive an indication that, for a first power mode of the plurality of power modes, the access terminal supports one or more of: a frame structure; dynamic switching between reduced hybrid automatic repeat request, H-ARQ, signaling and normal H-ARQ signaling; or dynamic switching between low power discontinuous reception, DRX, and normal DRX; determine whether the access terminal is to transition to the first power mode; and communicate a request for the access terminal to switch to the first power mode.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The disclosure relates in some aspects to an energy-aware architecture that supports a low power scheduling mode. In some aspects, a media access control (MAC) design for a base station (e.g., an enhanced Node B (eNB)) and associated access terminals (e.g., user equipment (UEs)) can take the power needs of the access terminals into account when scheduling the access terminals. In some aspects, an access terminal may support a particular frame structure for a low power mode. Accordingly, scheduling of the access terminal may include use of the particular frame structure during low power mode.

The disclosure relates in some aspects to signaling for supporting low power scheduling. For example, an access terminal may signal its low power capabilities to a base station. In addition, either the access terminal or the base station may request a transition between power modes (e.g., normal power mode to low power mode, or vice versa).

The disclosure relates in some aspects to operations for supporting low power scheduling. For example, an access terminal and/or a base station may determine whether the access terminal will switch power modes based on one or more criteria.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
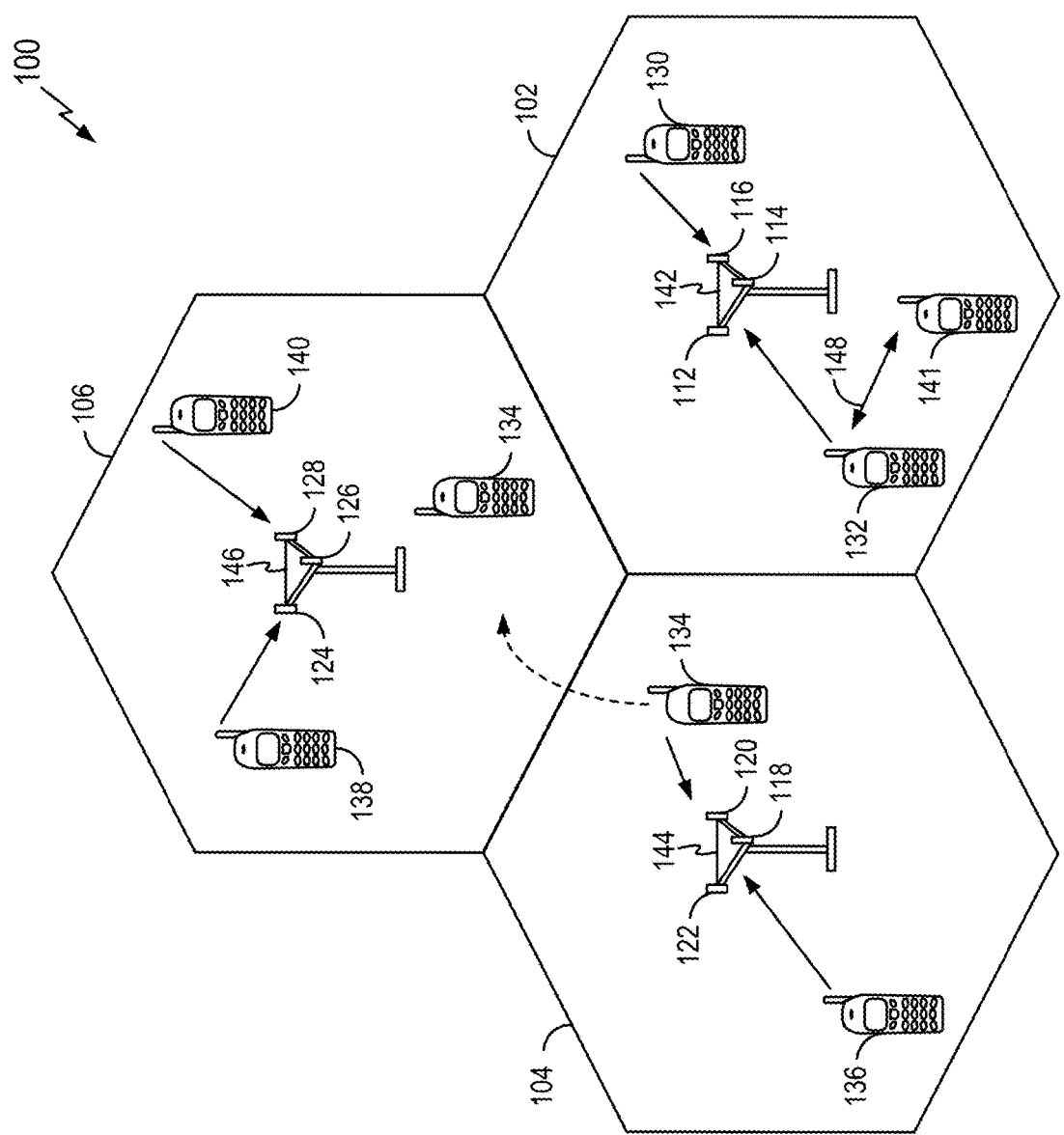
FIG. 1 is a block diagram illustrating an example of an access network in which one or more aspects of the disclosure may find application.

The various concepts presented throughout this disclosure may be implemented across a broad variety of communication systems, network architectures, and communication standards. Referring to FIG. 1, by way of example and without limitation, an access network 100 is shown in simplified form. The access network 100 can be implemented according to various network technologies including, without limitation, fifth generation (5G) technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The access network 100 includes multiple cellular regions (cells), including cells 102, 104, and 106, each of which may include one or more sectors. Cells may be defined geographically, e.g., by coverage area. In a cell that is divided into sectors, the multiple sectors within a cell can be formed by groups of antennas with each antenna responsible for communication with ATs in a portion of the cell. For example, in a cell 102, antenna groups 112, 114, and 116 may each correspond to a different sector. In cell 104, antenna groups 118, 120, and 122 may each correspond to a different sector. In a cell 106, antenna groups 124, 126, and 128 may each correspond to a different sector.

The cells 102, 104, and 106 may include several access terminals (ATs) that may be in communication with one or more sectors of each cell 102, 104, or 106. For example, ATs 130 and 132 may be in communication with an access point (AP) 142, ATs 134 and 136 may be in communication with an AP 144, and ATs 138 and 140 may be in communication with an AP 146. Also, ATs 132 and 141 as well as other ATs may communicate via direct signaling (e.g., device-to-device (D2D) signaling) as indicated, for example, by the communication symbol 148. In various implementations, an AP may be referred to or implemented as a base station, a NodeB, an eNodeB, and so on; while an AT may be referred to or implemented as a user equipment (UE), a mobile station, and so on.

Figure 2:
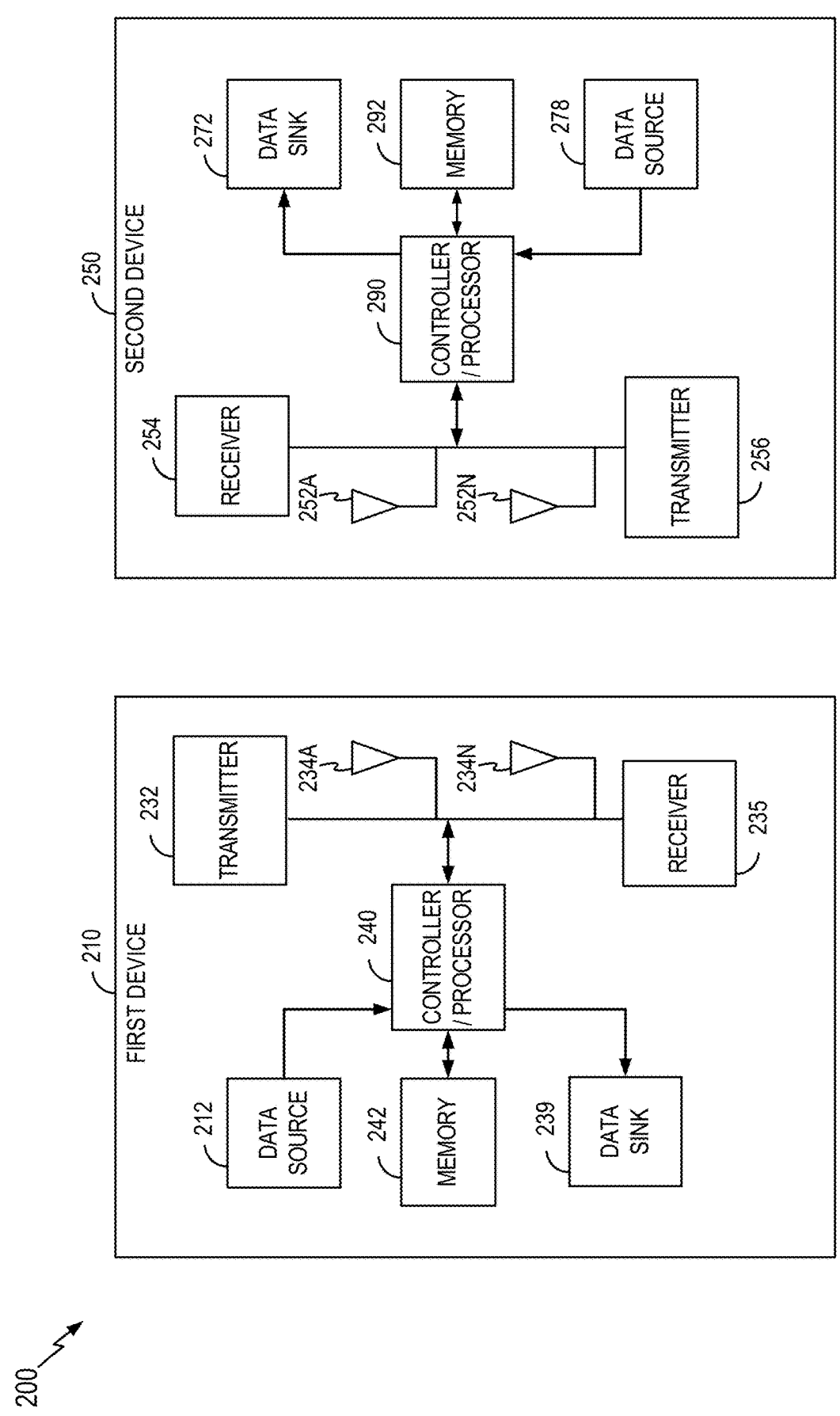
FIG. 2 is a block diagram illustrating an example of a first device in communication with a second device in a communication system according to some aspects of the disclosure.

FIG. 2 is a block diagram of system 200 including a first device 210 in communication with a second device 250, where the first device 210 and the second device 250 may be configured to provide functionality as taught herein. For example, the first device 210 and the second device 250 could be any of the devices in FIG. 1. In various operating scenarios, the first device 210 and/or the second device 250 may be a transmitter or transmitting device, or a receiver or receiving device, or both.

In a communication from the first device 210 to the second device 250, a controller or processor (controller/processor) 240 may receive data from a data source 212. Channel estimates may be used by the controller/processor 240 to determine the coding, modulation, spreading, and/or scrambling schemes for a transmitter 232. These channel estimates may be derived from a reference signal transmitted by the second device 250 or from feedback from the second device 250. The transmitter 232 may provide various signal conditioning functions including amplifying, filtering, and modulating frames onto a carrier for transmission over a wireless medium through antennas 234A-234N. The antennas 234A-234N may include one or more antennas, for example, including beam steering bidirectional adaptive antenna arrays, multiple-input multiple-output (MIMO) arrays, or any other suitable transmission/reception technologies.

At the second device 250, a receiver 254 receives the transmission through antennas 252A-252N (e.g., representing one or more antennas) and processes the transmission to recover the information modulated onto the carrier. The information recovered by the receiver 254 is provided to a controller or processor (controller/processor) 290. The controller/processor 290 descrambles and despreads the symbols, and determines the most likely signal constellation points transmitted by the first device 210 based on the modulation scheme. These soft decisions may be based on channel estimates computed by the controller/processor 290. The soft decisions are then decoded and deinterleaved to recover the data, control, and reference signals. Cyclic redundancy check (CRC) codes are then checked to determine whether the frames were successfully decoded. The data carried by the successfully decoded frames will then be provided to a data sink 272, which represents applications running in the second device 250 and/or various user interfaces (e.g., a display). Control signals carried by successfully decoded frames will be processed by the controller/processor 290. When frames are unsuccessfully decoded, the controller/processor 290 may also use an acknowledgement (ACK) and/or negative acknowledgement (NACK) protocol to support retransmission requests for those frames.

In the link from the second device 250 to the first device 210, data from a data source 278 and control signals from the controller/processor 290 are provided. The data source 278 may represent applications running in the second device 250 and various user interfaces (e.g., a keyboard). Similar to the functionality described in connection with the transmission by the first device 210, the controller/processor 290 provides various signal processing functions including CRC codes, coding and interleaving to facilitate forward error correction (FEC), mapping to signal constellations, spreading with orthogonal variable spreading factors (OVSFs), and scrambling to produce a series of symbols. Channel estimates, derived by the controller/processor 290 from a reference signal transmitted by the first device 210 or from feedback contained in a midamble transmitted by the first device 210, may be used to select the appropriate coding, modulation, spreading, and/or scrambling schemes. The symbols produced by the controller/processor 290 will be utilized to create a frame structure. The controller/processor 290 creates this frame structure by multiplexing the symbols with additional information, resulting in a series of frames. The frames are then provided to a transmitter 256, which provides various signal conditioning functions including amplification, filtering, and modulating the frames onto a carrier for transmission over the wireless medium through the antennas 252A-252N.

The transmission is processed at the first device 210 in a manner similar to that described in connection with the receiver function at the second device 250. A receiver 235 receives the transmission through the antennas 234A-234N and processes the transmission to recover the information modulated onto the carrier. The information recovered by the receiver 235 is provided to the controller/processor 240, which parses each frame. The controller/processor 240 performs the inverse of the processing performed by the controller/processor 290 in the second device 250. The data and control signals carried by the successfully decoded frames may then be provided to a data sink 239. If some of the frames were unsuccessfully decoded by the controller/processor 240, the controller/processor 240 may also use a positive acknowledgement (ACK) and/or negative acknowledgement (NACK) protocol to support retransmission requests for those frames.

The controllers/processors 240 and 290 may be used to direct the operation at the first device 210 and the second device 250, respectively. For example, the controllers/processors 240 and 290 may provide various functions including timing, peripheral interfaces, voltage regulation, power management, and other control functions. The computer readable media of memories 242 and 292 may store data and software for the first device 210 and the second device 250, respectively.

In accordance with various aspects of the disclosure, an element, or any portion of an element, or any combination of elements may be implemented with the controllers/processors 240 and 290 (e.g., that may each include one or more processors). The controllers/processors 240 and 290 are responsible for general processing, including the execution of software stored in the memory 242 or 292. The software, when executed by the controllers/processors 240 and 290, causes the controllers/processors 240 and 290 to perform the various functions described below for any particular apparatus. The memory 242 or 292 may also be used for storing data that is manipulated by the controllers/processors 240 and 290 when executing software.

In various aspects of the disclosure, an apparatus may be utilized in a wireless communication network, as a scheduling entity (e.g., an AP) and/or as a non-scheduling or subordinate entity (e.g., a UE). In any case, the apparatus may communicate with one or more wireless entities over an air interface. In any wireless communication network, channel conditions corresponding to the air interface will change over time.

Many networks accordingly use one or more rate control loops to dynamically adapt to the channel. For example, a transmitting device may configure one or more transmission parameters, including but not limited to a modulation and coding scheme (MCS), a transmission power, etc., to target a desired error rate at the receiving device. The receiving device that is receiving a packet-switched data stream typically checks the integrity of packets (e.g., using a cyclic redundancy check or CRC, a checksum, PHY layer channel coding pass/fail status, etc.) and may report back to the transmitting device using an acknowledgment or non-acknowledgment. This integrity check and reporting frequently, though not always, takes the form of an automatic repeat request (ARQ) and/or hybrid automatic repeat request (HARQ) algorithm. In other examples, any suitable algorithm or means of providing feedback information or response transmissions from the receiving device to the transmitting device may be used, such as reports relating to channel quality.

Low Power Mode Architecture

The disclosure relates in some aspects to an energy-aware architecture (e.g., a MAC architecture) that supports a low power scheduling mode. Such an architecture could support a different number of power modes (e.g., two or more power modes) in different implementations.

The disclosure relates in some aspects to a dynamic frame structure for supporting different power modes. For example, communicating devices may use a first frame structure for a first power mode (e.g., a normal power mode, a high power mode, etc.) and use a second frame structure for a second power mode (e.g., a lower power mode, a low power mode, etc.).

Figure 3:
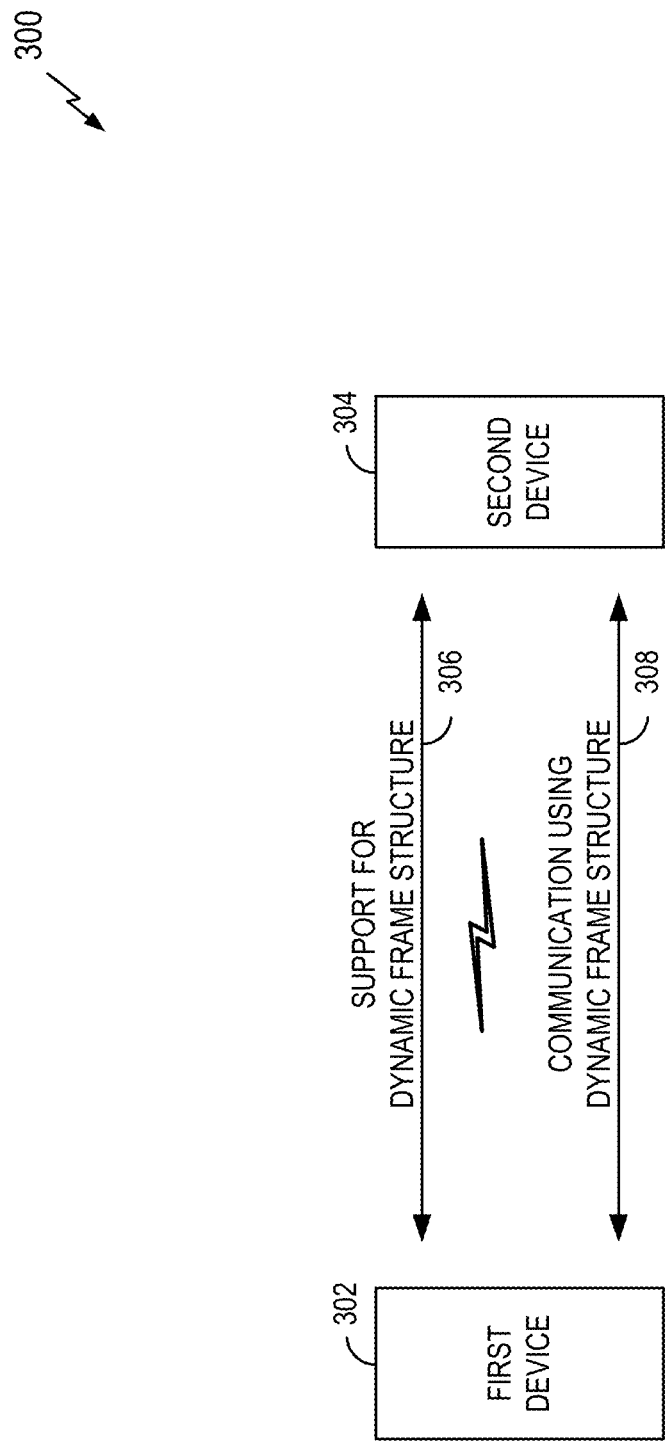
FIG. 3 illustrates examples of dynamic frame structure signaling in accordance with some aspects of the disclosure.

FIG. 3 illustrates an example of a communication system 300 that supports such a dynamic frame structure. The communication system 300 includes a first device 302 and a second device 304 that may communicate in different power modes (e.g., at least one of the devices may occasionally transition to a lower power mode). In some implementations, the first device 302 is an access terminal (e.g., a UE) and the second device 304 is an access point (e.g., an eNB). In some implementations, the first device 302 and the second device 304 are peer devices. At some point in time (e.g., when the first device 302 and the second device 304 initially associate with each other), the first device 302 and the second device 304 signal support 306 for the dynamic frame structure. For example, the first device 302 may send a message to the second device 304 where the message indicates the frame structure to be used for a low power mode. Thus, subsequent communication 308 during the low power mode (e.g., when the first device 302 is operating in the low power mode) may use the designated dynamic frame structure.

Several example aspects of the disclosure will be described with reference to FIGS. 4-8. For purposes of illustration, these figures may illustrate various components in the context of scheduling for 3GPP technology. It should be appreciated, however, that the teachings herein may employ other types of devices and be implemented using other types of radio technologies and architectures. Also, various operations may be described as being performed by specific types of components (e.g., eNBs, base stations, client devices, peer-to-peer devices, UEs, and so on). It should be understood that these operations can be performed by other types of devices. To reduce the complexity of these figures, only few example components are shown. However, the teachings herein can be implemented using a different number of components or other types of components.

A network can help a UE save energy if the network MAC architecture is energy-aware. In a topology where an efficient scheduling MAC entity is present, e.g., a 5G cellular network or evolution of LTE, the scheduling could take into account a UE's power saving features support and the UE's need to save power.

For purposes of illustration, two power modes for UEs will be described in the discussion that follows. A low power mode UE refers to a UE that is being served with a power-saving scheduling scheme. A normal (e.g., power-agnostic) mode UE refers to a UE being served with another scheduling scheme for which energy is not a criterion. For example, one or more of throughput performance, latency, or spectral efficiency could be the primary scheduling criteria for a normal mode UE. It should be appreciated that at different points in time a given UE could be a low power mode UE or a normal mode UE depending, for example, on the current communication requirements of the UE.

In a cellular network, MAC scheduling typically runs on the base station (e.g., an eNB in LTE), and the scheduling is to control access to the shared transmission medium among one or more UEs. Therefore, the topology of a base station and UEs are typically one-to-many. The teachings herein are not limited to such a topology, however. For example, the teachings herein may be applicable to peer-to-peer devices, mesh devices, and other devices.

In some scenarios, it might not be practical to allow all UEs to be scheduled in low power mode, even if all of them prefer to save power. In this case, a base station may select a subset of UEs for low power mode scheduling, and use normal mode scheduling for the rest of the UEs.

Some implementations employ more than one power profile (e.g., a list of the power saving features to utilize) for a UE. For example, profiles that are more energy-efficient could be application dependent.

The disclosure relates in some aspects to signaling to support low power scheduling. A base station (e.g., an eNB) can learn a UE's capabilities for low power features via signaling from the UE. In some implementations, this signaling involves passing parameters in a UE capability message from the UE to the network. In some implementations, this is done relatively infrequently. For example, such a message may be sent once during initial UE context setup and/or updated per radio resource control (RRC) connection setup. As mentioned above, a UE capability may consist of more than one power saving profiles in some cases.

Figure 4:
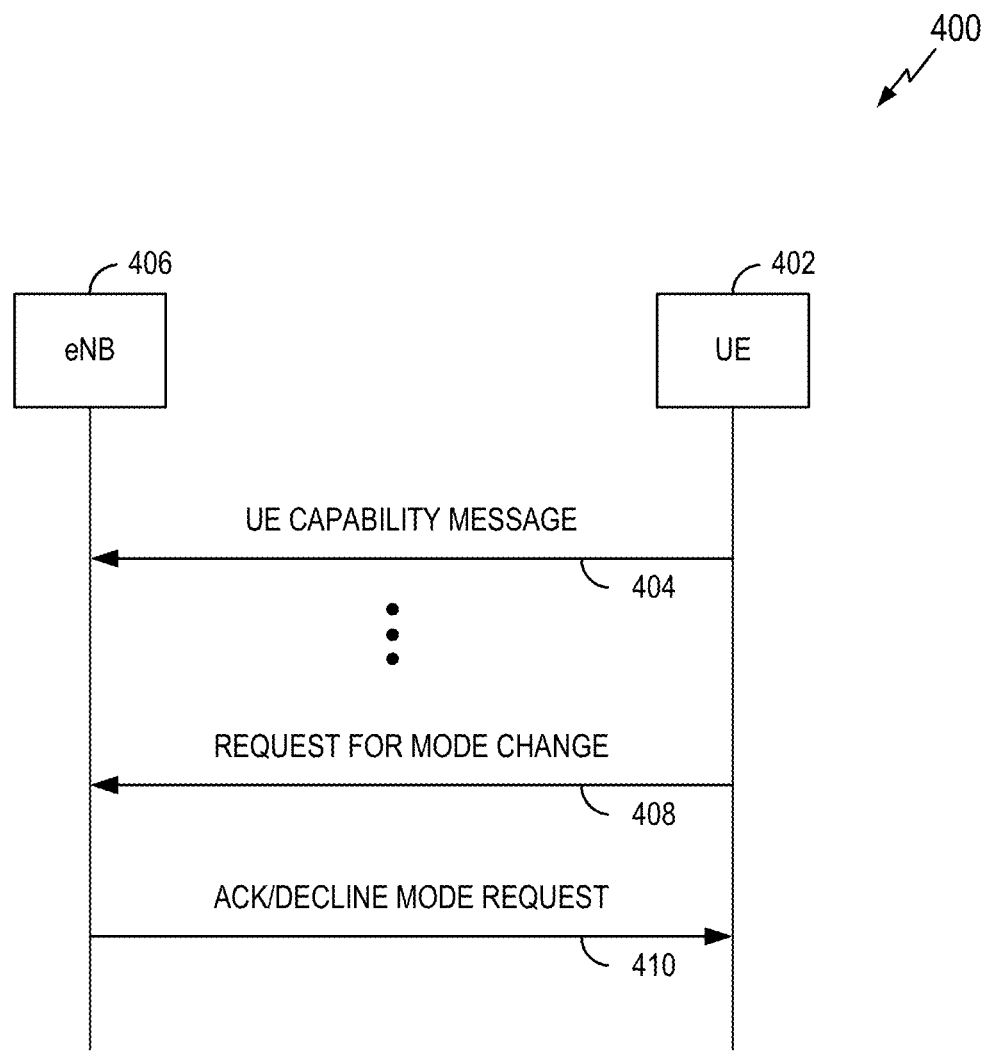
FIG. 4 illustrates a first example of mode change signaling in accordance with some aspects of the disclosure.
Figure 5:
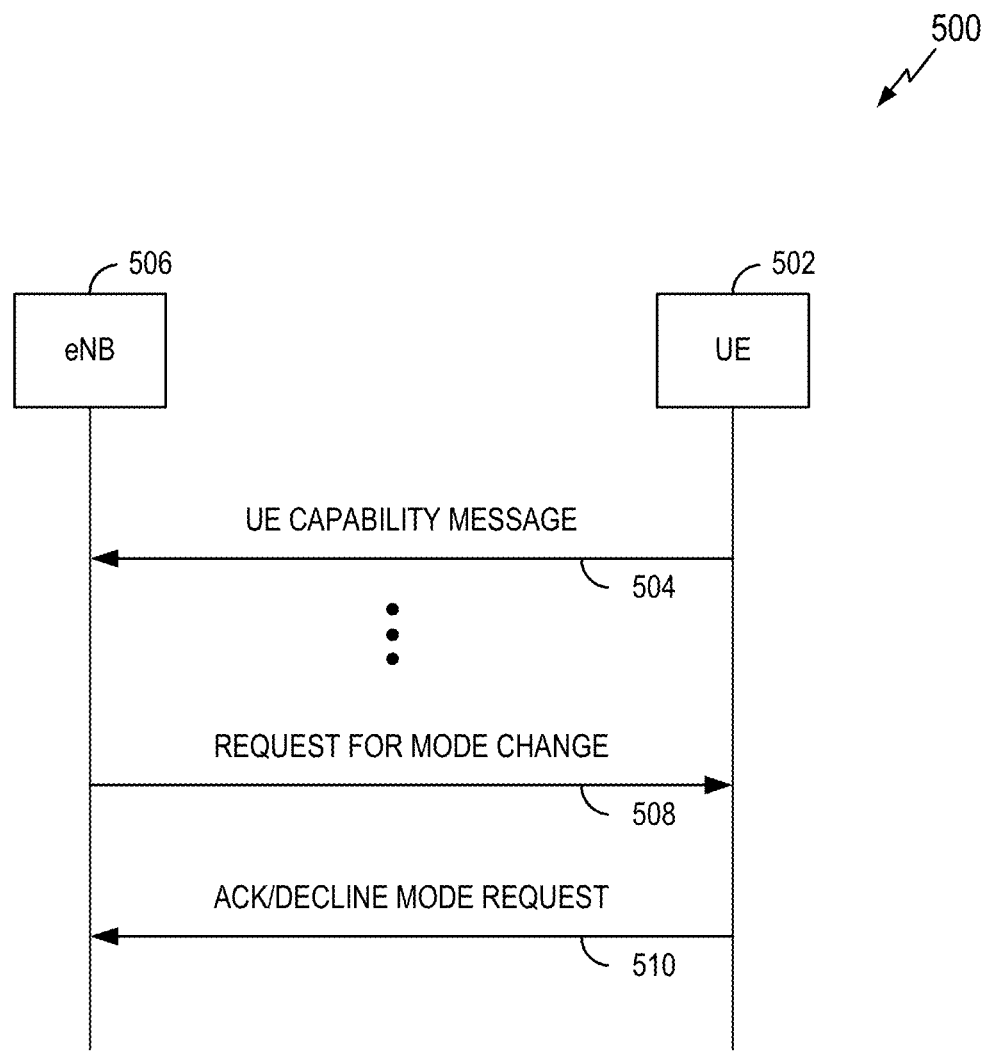
FIG. 5 illustrates a second example of mode change signaling in accordance with some aspects of the disclosure.

A switch from one power mode to another can be triggered by an ENB or a UE. FIGS. 4 and 5 illustrate examples of signaling 400 and 500, respectively, for each of these scenarios.

In the signaling 400 of FIG. 4, a UE 402 sends a UE capability message 404 to an eNB 406 to inform the eNB 406 of the power saving profile(s) supported by the UE 402, if any. As discussed in more detail below, at some point in time, the UE 402 may send a request 408 for a power mode change to the eNB 406. In response, the eNB 406 may send a message 410 acknowledging (ACK) or declining the request.

In the signaling 500 of FIG. 5, a UE 502 sends a UE capability message 504 to an eNB 506 to inform the eNB 506 of the power saving profile(s) supported by the UE 502, if any. As discussed in more detail below, at some point in time, the eNB 506 may send a request 508 for a power mode change to the UE 502. The UE 502 may optionally send a message 510 acknowledging (ACK) or declining the request.

A power mode switch can take various forms depending on the number of power modes supported. In cases where two power modes are supported, a power mode switch includes a transition from a normal mode to a low power mode, or vice versa. In cases where more than two power modes are supported, a power mode switch can consist of a transition from a normal mode to any of a plurality of low power modes or a transition from one of the low power modes to any of the other low power modes or the normal mode.

A network may default to either a normal scheduling mode or low power scheduling mode. Thus, in the former case, an initial power mode transition will be from a normal mode to a low power mode. In the latter case, an initial power mode transition will be from a low power mode to a normal mode. At some later point in time, there generally will be a transition back to the default mode.

Transition to Low Power Mode—UE Triggered

In some scenarios, a transition to a low power mode is triggered by a UE. One or more conditions may trigger a UE to request a low power scheduling mode and a preferred power saving profile. These conditions could be configured by the operator in advance (e.g., during registration of a device), during provisioning of the device, or based on factory settings for the device. Several non-limiting examples of such conditions follow.

Battery Level.

A low battery level condition at a UE may trigger the UE to request a switch to a low power mode.

Application Requirements.

In the event the applications currently running on a UE do not require high performance (e.g., the applications employ a low data rate and/or delay tolerant traffic), the UE may request a switch to a low power mode.

Context.

If the UE is context aware (e.g., the UE is able to determine whether or not it is at home, at the office, on a trip, or otherwise traveling), certain contexts may trigger the UE to request a switch to a low power mode. For example, an assumption may be made that a UE that is on the move might not have access to AC power. In this case, the UE may request a switch to a low power mode.

Usage.

A UE may monitor its usage patterns (e.g., prediction of power demand) to determine whether to switch to a low power mode. For example, if low usage is typically seen at certain times of day and/or at certain locations, the UE may request a switch to a low power mode under those conditions.

Once an eNB receives a request to switch to a low power mode from a UE, the eNB determines whether it should accept the UE for low power scheduling mode. Thus, as indicated in the signaling 400 of FIG. 4, the eNB may send an acknowledgement or decline message to the UE in response to the request.

Several non-limiting examples of criteria for determining whether to accept or reject the UE follow.

Number of Low Power UEs.

A given eNB may have a limit on the number of UEs within that eNB's coverage that are allowed to be in low power mode at the same time. Thus, if the number of UEs already in low power mode exceeds the threshold amount, the eNB may reject the UE's request to enter the low power mode.

Sector Loading.

In some cases, supporting UEs in low power mode may be spectrally inefficient. For example, a given eNB might only support a limited quantity of resources (e.g., physical resource blocks). Some of these resources may be allocated to UEs operating in low power mode. However, these UEs might not be using the allocated resources efficiently. Thus, an eNB may elect to restrict support for low power mode in the event the number of available resources at the eNB falls below a threshold level.

In the event that requests for low power mode from multiple UEs are pending, an eNB could prioritize and/or process the requests jointly based on criteria such as fairness, potential power saving, etc. Thus, the eNB could queue the requests and perform joint optimization for UE selection.

In the event the eNB accepts the UE for low power mode, within the preferred low power profile, the eNB further determines if all or a subset of power saving features supported by the UE should be utilized.

Transition to Low Power Mode—eNB Triggered

In some scenarios, a transition to a low power mode is triggered by the network (e.g., an eNB). For example, for an eNB triggered low power mode, an eNB may command a UE to expect a low power scheduling mode. The UE may optionally acknowledge the command See, for example, the signaling 500 of FIG. 5.

In some implementations, the UE may optionally decline a request to enter low power mode sent by an eNB. This may occur, for example, if any of the conditions that warrant a transition from a low power mode (discussed below) exist at the UE.

Transition to Normal Mode—UE Triggered

In some cases, a transition from a low power mode to a normal mode is triggered by a UE. For example, a UE may explicitly request normal (e.g., power-agnostic) mode for higher performance, better latency, etc, depending on a similar set of conditions as discussed above in conjunction with the transition to a low power mode, but in an inverse way. These conditions could be configured by the operator in advance (e.g., during registration of device), during provisioning of the device, or based on factory settings for the device. Several non-limiting examples of such conditions follow.

Battery Level.

A high battery level condition at a UE may trigger the UE to request a switch to a normal mode.

Application Requirements.

In the event the applications currently running on a UE do require high performance (e.g., the applications employ a high data rate and/or delay intolerant traffic), the UE may request a switch to a normal mode.

Context.

If the UE is context aware (e.g., the UE is able to determine whether or not it is at home, at the office, on a trip, or otherwise traveling), certain contexts may trigger the UE to request a switch to a normal mode. For example, an assumption may be made that a UE that is at home or at the office might have access to AC power. In this case, the UE may request a switch to a normal mode.

Usage.

A UE may monitor its usage patterns (e.g., prediction of power demand) to determine whether to switch to a normal mode. For example, if high usage is typically seen at certain times of day and/or at certain location, the UE may request a switch to a normal mode under those conditions.

Once an eNB receives a request to switch to a normal mode from a UE, the eNB determines whether it should accept the UE for normal scheduling mode. Thus, as indicated in the signaling 400 of FIG. 4, the eNB may send an acknowledgement or decline message to the UE in response to the request.

Transition to Normal Mode—eNB Triggered

In some scenarios, a transition to a normal mode is triggered by the network (e.g., an eNB). For example, for an eNB triggered normal mode, an eNB may command a UE to expect a normal scheduling mode. Several non-limiting examples of such conditions follow.

Reprioritization of Low Power Mode UEs, Triggered by New Requests from UEs for low power mode.

The network could request some UEs to transition out of low power mode such that other requesting UEs could be allowed to transition into low power mode. The criteria for such reprioritization could be based on fairness, optimization for potential aggregate power saving, or other factors.

Reprioritization of Low Power Mode UEs, Due to Periodic Maintenance.

The network could request some UEs to transition out of low power mode, and request some other UEs to transition into low power mode. The criteria for such reprioritization could be based on fairness, optimization for potential aggregate power saving, or other factors.

The UE may optionally acknowledge the command See, for example, the signaling 500 of FIG. 5.

In some implementations, the UE may optionally decline a request to enter normal mode sent by an eNB. This may occur, for example, if any of the conditions that warrant a transition to a low power mode (discussed above) exist at the UE.

Power Saving Features

Several examples of power saving features that may be employed for a low power scheduling mode follow. A given UE may support one or more of these or other power saving features.

Modulation and Coding (MCS).

Different MCSs may have different impact on power consumption. Thus, for low power mode, a UE may use energy-efficient coding (e.g., a convolutional code).

MIMO and Transmission Mode.

In some scenarios, the use of multiple input multiple out (MIMO) signaling may be power inefficient. For example, in some cases, a UE may be able to achieve a desired data rate by using a high order constellation. In the event the high order constellation is more energy efficient than MIMO, the UE may use the high order constellation instead of MIMO. Also, certain MIMO and transmission mode schemes allow the use of a low complexity receiver that may have lower power consumption. For example, some schemes may use a linear minimum means square error (MMSE) receiver instead of a maximum-likelihood (ML) receiver to demodulate the MIMO spatial streams.

In some scenarios, the use of multiple antennas may be power inefficient. For example, in some cases, a UE may be able to achieve a desired data rate by using a single antenna. In the event use of the single antenna is more energy efficient than the use of multiple antennas (e.g., the required data throughput is low), the UE may use a single antenna instead of multiple antennas (e.g., if doing so does not unduly expand the timeline).

Reduced Carrier Aggregation (CA).

In some scenarios, the use of CA may be power inefficient. For example, in some cases, a UE may be able to achieve a desired data rate without CA. In the event not using CA is more energy efficient than using CA, the UE may elect to not use CA.

Reduced H-ARQ Signaling Data Rate.

Energy efficiency can be increased by reducing the signaling rate used for hybrid automatic repeat request (H-ARQ). This signaling rate may be reduced, for example, by bundling the acknowledgements (ACKs).

Low Power Discontinuous Reception (DRX).

DRX may be adapted to reduce power consumption. For example, a larger DRX cycle (longer latency) may be employed to increase sleep time. Also, a first device could send a "go-away" signal to a second device to tell the second device that the first device will be asleep for a certain period of time or to tell the second device to go to sleep for a certain period of time.

Enhanced Microsleep.

Microsleep is a feature that allows, for example, the scheduled entity (e.g., a terminal) to go into sleep mode within a TTI when the control channel indicates that there is no downlink (DL) assignment or uplink (UL) grant. To further reduce power consumption, the scheduled entity could report its sleep capabilities (e.g., different levels of sleep supported and corresponding minimum sleep durations) to the scheduling entity (e.g., an eNB), so that the scheduling entity could schedule in ways that maximize the application of microsleep, such as use of time division multiplexing (TDM) scheduling instead of frequency division multiplexing (FDM). Moreover, the scheduling entity could switch to a longer TTI format or use explicit signaling to facilitate longer and deeper sleep for more power savings.

An example of explicit signaling includes a message to guarantee to the scheduled entity (e.g., a terminal) that it will not be scheduled for the next N TTIs, where N could be determined in accordance with the quality of service (QoS) requirement and reported sleep capabilities.

Dynamic Frame Structure

The disclosure relates in some aspects to the use of a dynamic frame structure with power saving features that may be employed for different scheduling modes. A given device may support various configurations of such a dynamic frame structure.

Figure 6:
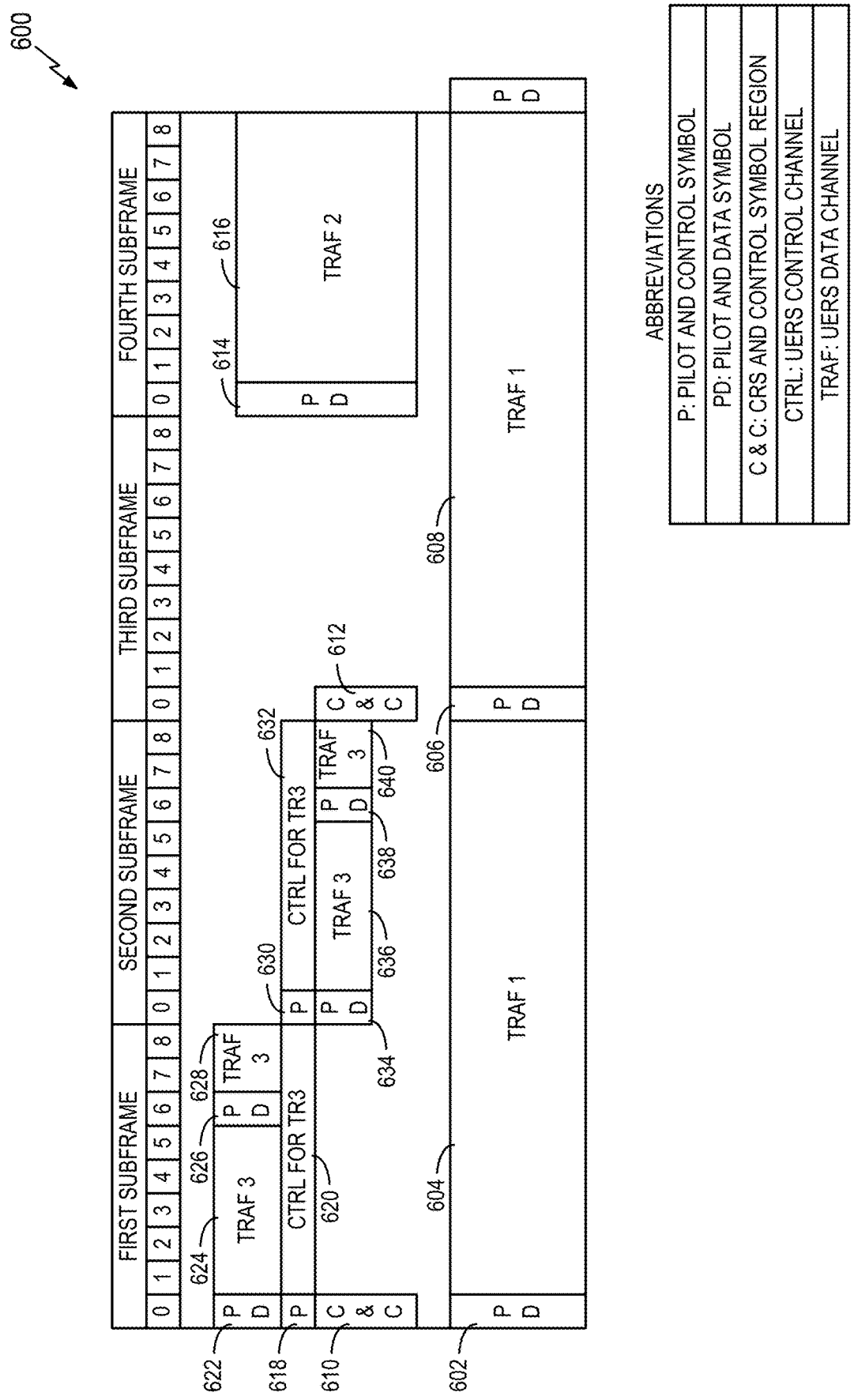
FIG. 6 illustrates an example of a dynamic frame structure in accordance with some aspects of the disclosure.

FIG. 6 illustrates an example of a frame structure 600 (e.g., a unified framework) that can support low power scheduling in accordance with the teachings herein. Flexible TTI, flexible pilot, and flexible control overhead are employed to achieve a desired tradeoff between latency, power, and memory usage. For example, different TTIs lengths could be used for different users, applications, etc. The quantities and dimensions used in FIG. 6 are for purposes of illustration only. Other implementations could use other timing, bandwidth, and allocations.

The disclosure relates in some aspects to the use of a frame structure that allows for dynamic bandwidth (BW) switching for control/data multiplexing. For example, a control segment may be narrowband, while a data segment is wideband. Also, adaptive BW may be employed for the data segment, with an agile center frequency and associated null tone overhead.

The disclosure relates in some aspects to the use of a frame structure that allows for narrowband control and data transmission. This structure may facilitate power efficiency for very low latency (e.g., transmission time interval (TTI) time scale) traffic and/or low/medium data rate traffic. Again, adaptive BW with associated null tone overhead may be employed.

The effectiveness of a given power saving feature may be implementation dependent. Example methods to control/select which power saving features to use may include, without limitation: 1) An original equipment manufacturer (OEM) and/or a network operator determining power saving effectiveness and pruning some features (e.g., relatively ineffective features) out of the UE capability; and 2) Including, in the UE capability list, the potential power savings (e.g., which could be approximated and categorized) along with the power saving features to enable an eNB to prioritize the use of the features. For example, a UE may quantify (e.g., in percentage, in absolute quantity values, etc.) how effectively a given feature saves power.

An eNB may select the features to be used for a given transition to lower power mode for a UE based on how effectively the different features save power. As a specific example, if a UE is running a chat program that uses small chunks of data, narrowband transmission may be selected since this mode may be more effective at saving power under these conditions. In contrast, if a UE is using a video application that uses large amounts of data, wideband transmission may be selected since this mode may more efficiently use power under these conditions.

The abbreviations that follow are used in FIG. 6. P represents at least one pilot and control symbol. PD represents at least one pilot and data symbol. C & C represents at least one cell-specific reference signal (CRS) and control symbol region. CTRL represents at least one UE reference signal (UERS) control channel. TRAF (TRAF [1, 2, or 3]) represents at least one UERS data channel.

An example of a low overhead mode is shown with reference to TRAF 1 (UERS Traffic 1). A first pilot and data symbol 602 in slot 0 of the first subframe precedes a first UERS data channel 604 in the first and second subframes. In addition, a second pilot and data symbol 606 in slot 0 of the third subframe precedes a second UERS data channel 608 in the third and fourth subframes.

This mode involves a relatively long TTI (two subframes), cross-TTI pilot filtering (e.g., so the pilot density is lower over time), low overhead (e.g., relative to the amount of data transmitted), and relatively high performance (e.g., large data transfers and/or high throughput). Other implementations of a low overhead mode might involve only of subset of these factors. Also, other implementations of a low overhead mode might involve other factors.

An example of a low power mode is shown with reference to TRAF 2 (UERS Traffic 2). A first CRS and CTRL symbol region 610 is at slot 0 of the first subframe and a second CRS and CTRL symbol region 612 is at slot 0 of the third subframe. A pilot and data symbol 614 precedes a UERS data channel 616 in the fourth subframe.

This mode involves a common reference signal (RS) and control for wakeup and decode, whereby traffic is scheduled in the next TTI. For example, a UE may wake up and, in narrowband, only decode the TDM pilots (e.g., CRS and CTRL). As indicated, this control area may be narrow both in terms of time and frequency. See the second CRS and CTRL symbol region 612. If there is no grant for the UE, the UE may therefore go quickly back to sleep to save power. If there is a grant, the UE may open up its RF for wideband communication during the next TTI (e.g., to receive the pilot and data symbol 614 and the UERS data channel 616). Other implementations of a low power mode might involve only a subset of the above factors. Also, other implementations of a low power mode might involve other factors.

An example of a low latency mode is shown with reference to TRAF 3 (UERS Traffic 3). In the first subframe, a first pilot and control symbol 618 in slot 0 precedes a first UERS control channel 620. In addition, a first pilot and data symbol 622 in slot 0 precedes a first UERS data channel 604, while a second pilot and data symbol 626 in slot 6 precedes a second UERS data channel 628. In the second subframe, a second pilot and control symbol 630 in slot 0 precedes a second UERS control channel 632. In addition, a third pilot and data symbol 634 in slot 0 precedes a third UERS data channel 636, while a fourth pilot and data symbol 638 in slot 6 precedes a fourth UERS data channel 640.

This mode involves per-TTI control grant and ACK/NAK feedback. This mode also supports narrowband processing, whereby a UE is allowed to operate within a relatively large section of bandwidth, even though the UE only uses a portion of the bandwidth at a time (e.g., the UE could hop between different frequency bands from one TTI to the next). In this case, the control processing can be narrowband as well. Other implementations of a low latency mode might involve only a subset of these factors. Also, other implementations of a low latency mode might involve other factors.

With the above in mind, an example of the low overhead mode will be treated in more detail with continued reference to the example of TRAF 1 in FIG. 6. Low overhead mode can be used for UEs that support large data volume. Such UEs may be, for example, less delay sensitive and/or tend to have a full buffer. In this example, the TTI is selected to be relatively long (e.g., 1 millisecond) with less pilot overhead per TTI, and cross TTI pilot filtering (e.g., using pilots from multiple TTIs for channel estimation) enabled. Such a mode can have relatively low pilot overhead and good performance with moderate latency. In some implementations, the UE decodes the control information every TTI duty cycle to save power. That is, the control information may be decoded less frequently in this case.

An example of the low power mode will be treated in more detail with continued reference to the example of TRAF 2 in FIG. 6.

The low power mode may be advantageous for microsleep. A UE may decode control information in a TDM and narrowband (NB) common-RS based control region for fast control decoding. To save power, the UE may go back to microsleep if no grant is decoded. Enhanced microsleep could be associated with low power mode operations.

The low power mode may be advantageous for dynamic bandwidth switching. A UE may decode control information in a center NB region. Then, when a grant is decoded, the UE may open up the wideband RF for data demodulation. The data channel can be scheduled later (e.g., one TTI later) than the control channel to reserve time for RF switching.

An example of the low latency mode and the narrowband mode will be treated in more detail with continued reference to the example of TRAF 3 in FIG. 6.

In an example of a low latency mode, a UE may monitor control and data per TTI to decode delay-sensitive data. The control channel could be staggered across TTIs to reduce decoding latency. Such a low latency mode could be used, for example, if the decoding latency requirement is very low. As indicted, shorter TTIs are used in this mode.

In an example of a narrowband (NB) mode UE, a UE is configured to decode control and data in a dedicated bandwidth of the entire wide band. The UE may hop to another carrier frequency to decode control and/or data in response to a request or eNB configuration. Demodulation reference signal (DMRS)-based control may be used to ensure localized NB processing of control, as well as reduced pilot overhead. The control channel could be staggered across TTIs to allow for data and control pipelining, and to reduce buffering requirements. The NB control/data mode allows a UE with NB RF capability to share a chunk of bandwidth from a much wider bandwidth.

Example Processes

Figure 7:
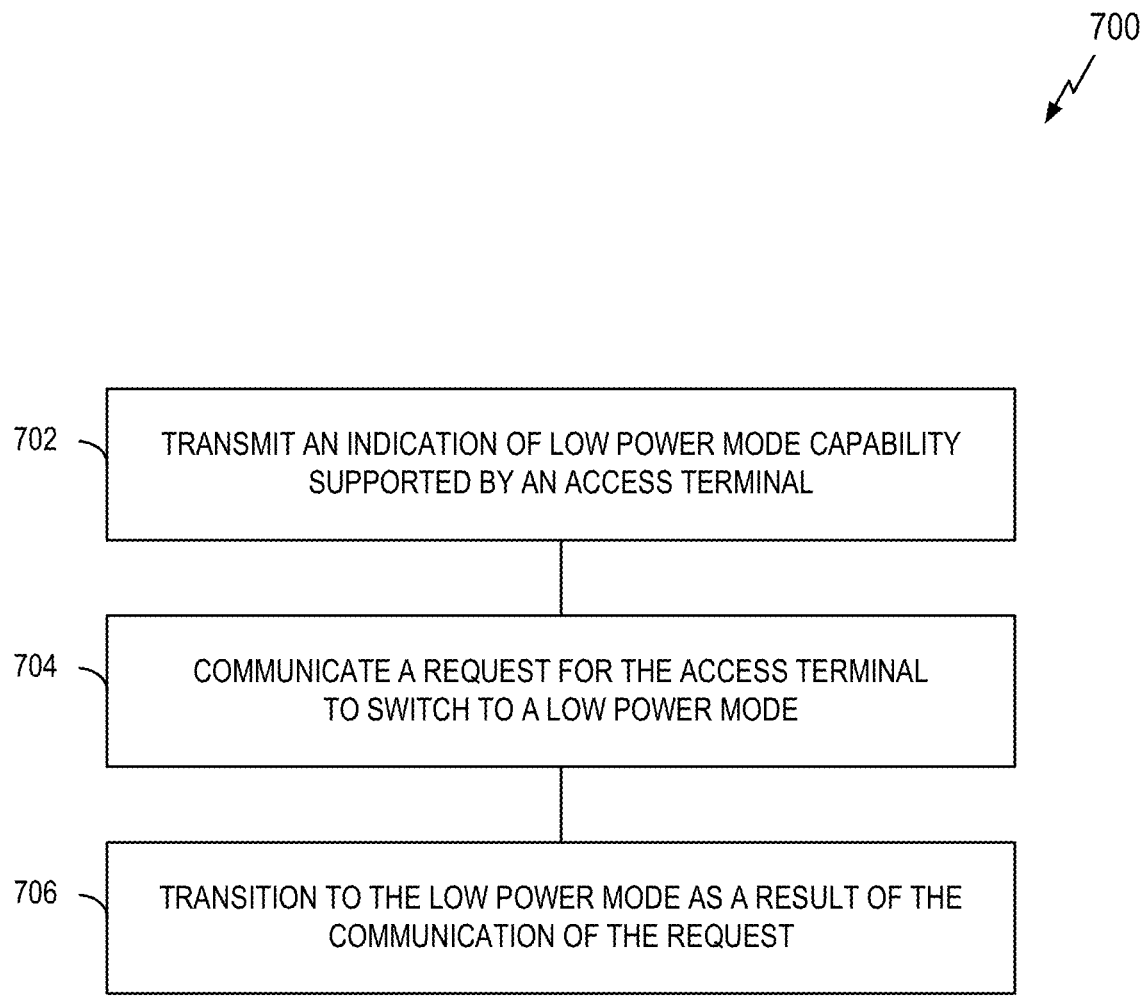
FIG. 7 illustrates an example of a scheduling process in accordance with some aspects of the disclosure.

FIG. 7 illustrates a process 700 for supporting scheduling in accordance with some aspects of the disclosure. The process 700 may take place within a processing circuit (e.g., the processing circuit 910 of FIG. 9), which may be located in an access terminal, a base station, or some other suitable apparatus. Of course, in various aspects within the scope of the disclosure, the process 700 may be implemented by any suitable apparatus capable of supporting scheduling-related operations.

At block 702, an apparatus (e.g., a UE) transmits an indication of low power mode capability supported by an access terminal. For example, a UE may send this information to an eNB via a UE capability message.

In some aspects, the low power mode capability may include at least one power saving feature. In some aspects, the at least one power saving feature may include at least one of: a frame structure, a frame structure for dynamic bandwidth switching for control and data multiplexing, a frame structure for narrowband control and data transmission, a modulation and coding scheme, a convolutional coding scheme, antenna selection, multiple input multiple output (MIMO) transmission mode, non-MIMO transmission mode, carrier aggregation, no carrier aggregation, reduced hybrid automatic repeat request (H-ARQ) signaling, low power discontinuous reception (DRX), or enhanced microsleep. In some aspects, the frame structure for dynamic bandwidth switching for control and data multiplexing includes a narrowband control segment and a wideband data segment. In some aspects, the frame structure supports adaptive bandwidth for a data segment. In some aspects, the low power mode capability includes at least one indication of potential power saving associated with the at least one power saving feature.

In some aspects, the low power mode capability may include a plurality of power saving features and a plurality of indications of potential power saving associated with the power saving features. In this case, the process 700 may further include prioritizing the power saving features based on the indications of potential power saving.

At block 704, the apparatus communicates a request for the access terminal to switch to a low power mode.

In some aspects, the communication of the request includes transmitting the request. For example, a UE may transmit such a request to an eNB. In this case, an acknowledgement to the request may be received (e.g., from an eNB) in response to the request.

In some aspects, the communication of the request includes receiving the request. For example, a UE may receive such a request from an eNB. In this case, an acknowledgement may be transmitted in response to the receipt of the request (e.g., the UE may transmit an acknowledgement to the eNB).

In some aspects, the low power mode capability of block 702 may include a plurality of power saving features. In this case, the process 700 may further include selecting at least one of the power saving features for the low power mode.

At block 706, the apparatus transitions to the low power mode as a result of the communication of the request at block 704. In some aspects, this transition may be triggered as a result of transmitting the request or receiving the request.

In scenarios where the communicating of the request at block 704 involves receiving the request and an acknowledgement is transmitted in response to the request, the transition to the low power mode may be triggered as a result of transmitting the acknowledgement.

In scenarios where the communicating of the request at block 704 involves transmitting the request and an acknowledgement to the request is received, the transition to the low power mode may be triggered as a result of receiving the acknowledgement.

In some aspects, the transition to the low power mode may be triggered based on at least one criterion. In some aspects, the at least one criterion may include at least one of: a battery level, an application requirement, a traffic requirement, access terminal context, or access terminal usage.

Figure 8:
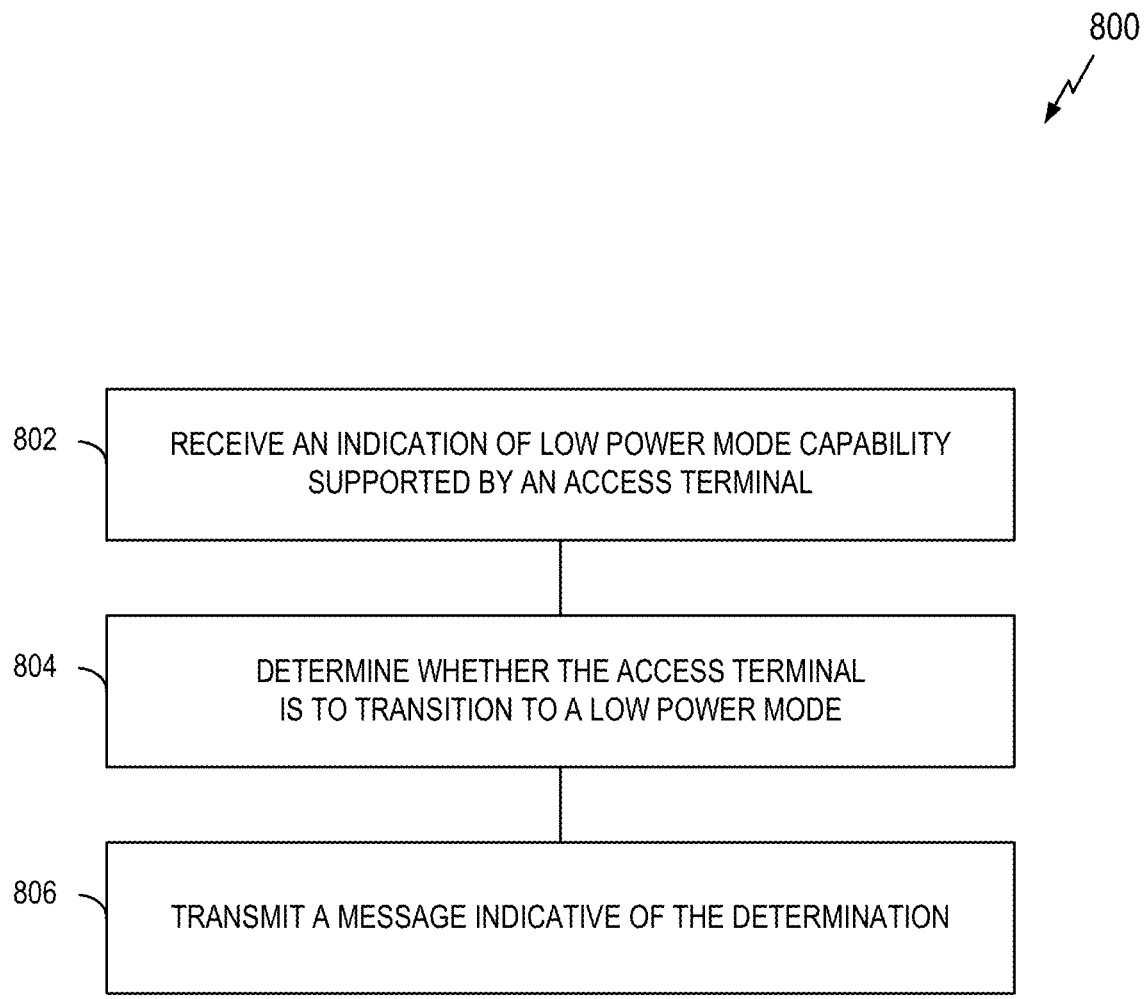
FIG. 8 illustrates another example of a scheduling process in accordance with some aspects of the disclosure.

FIG. 8 illustrates a process 800 for supporting scheduling in accordance with some aspects of the disclosure. The process 800 may take place within a processing circuit (e.g., the processing circuit 1110 of FIG. 11), which may be located in a base station, an access terminal, or some other suitable apparatus. Of course, in various aspects within the scope of the disclosure, the process 800 may be implemented by any suitable apparatus capable of supporting scheduling-related operations.

At block 802, an apparatus (e.g., an eNB) receives an indication of low power mode capability supported by an access terminal. For example, an eNB may receive this information via a UE capability message.

In some aspects, the low power mode capability may include at least one power saving feature. In some aspects, the at least one power saving feature may include at least one of: a frame structure, a frame structure for dynamic bandwidth switching for control and data multiplexing, a frame structure for narrowband control and data transmission, a modulation and coding scheme, a convolutional coding scheme, antenna selection, multiple input multiple output (MIMO) transmission mode, non-MIMO transmission mode, carrier aggregation, no carrier aggregation, reduced hybrid automatic repeat request (H-ARQ) signaling, low power discontinuous reception (DRX), or enhanced microsleep. In some aspects, the frame structure for dynamic bandwidth switching for control and data multiplexing includes a narrowband control segment and a wideband data segment. In some aspects, the frame structure supports adaptive bandwidth for a data segment. In some aspects, the low power mode capability includes at least one indication of potential power saving associated with the at least one power saving feature.

In some aspects, the low power mode capability may include a plurality of power saving features and a plurality of indications of potential power saving associated with the power saving features. In this case, the process 800 may further include prioritizing the power saving features based on the indications of potential power saving.

At block 804, the apparatus determines whether the access terminal is to transition to a low power mode. In some cases, this determination is made unilaterally by the eNB. In some cases, this determination is made in response to a request from the UE.

In some aspects, the determination is based on at least one of: a quantity of access terminals currently operating in low power mode, traffic loading, time of day, or resource availability at an access point (e.g., at a base station such as an eNB).

In some aspects, the low power mode capability of block 802 includes a plurality of power saving features. In this case, the process 800 may further include selecting at least one of the power saving features for the low power mode.

At block 806, the apparatus transmits a message indicative of the determination of block 804. For example, the message may be a request from an eNB to a UE or an acknowledgement of a request received by an eNB from a UE.

In some aspects, the message includes a request to the access terminal to transition to the low power mode.

In scenarios where a request from the access terminal to transition to the low power mode is received (e.g., a UE is requesting that it be allowed to operate in a low power mode), the message of block 806 may be an acknowledgement of the request.

First Example Apparatus

Figure 9:
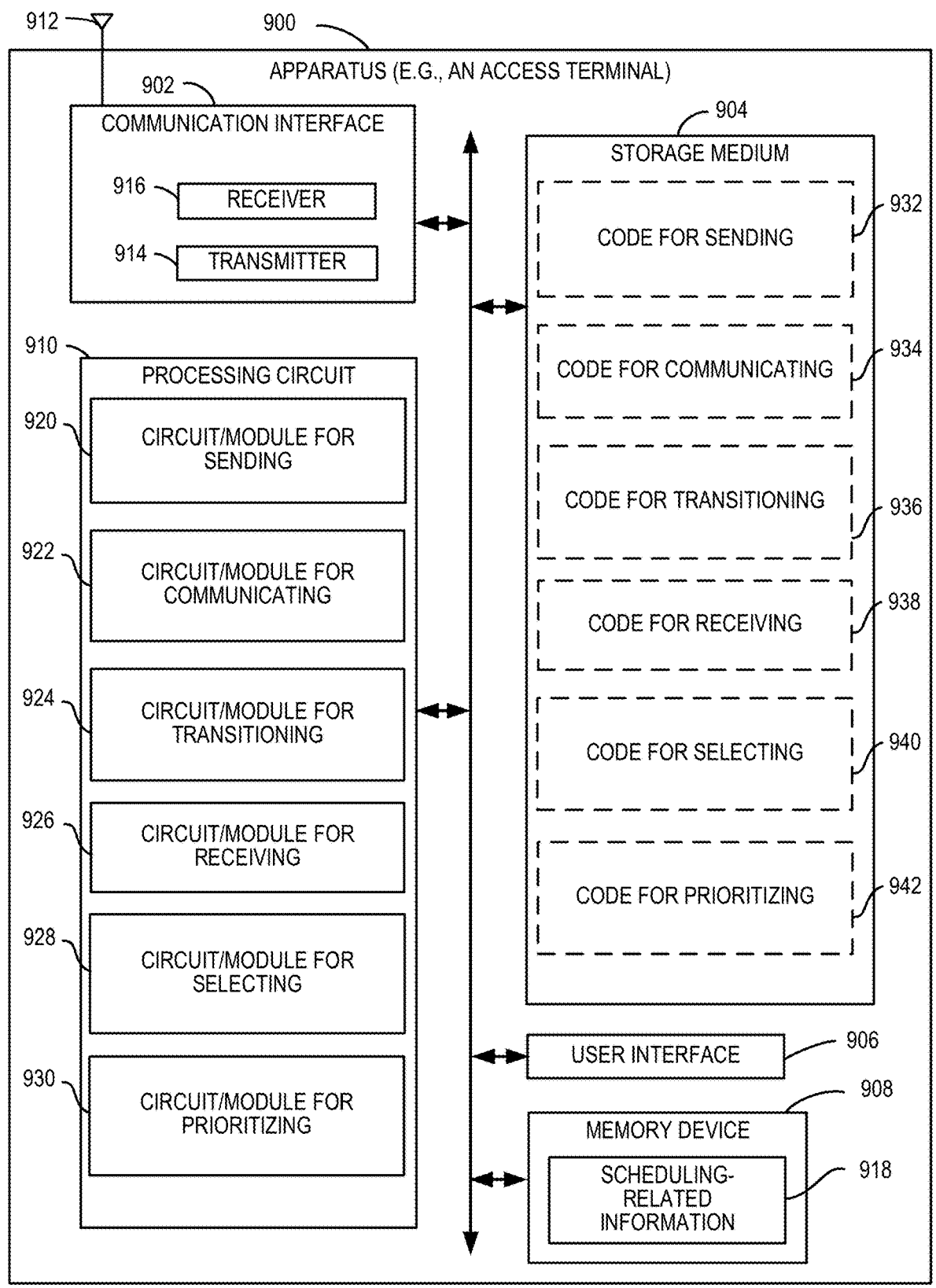
FIG. 9 illustrates a block diagram of an example hardware implementation for an apparatus (e.g., an electronic device) that can support scheduling in accordance with some aspects of the disclosure.

FIG. 9 is an illustration of an apparatus 900 that may support scheduling according to one or more aspects of the disclosure. The apparatus 900 could embody or be implemented within a mobile device, an access point, or some other type of device that supports wireless communication. In various implementations, the apparatus 900 could embody or be implemented within an access terminal, an access point, or some other type of device. In various implementations, the apparatus 900 could embody or be implemented within a mobile phone, a smart phone, a tablet, a portable computer, a server, a personal computer, a sensor, an entertainment device, a medical device, or any other electronic device having circuitry. The apparatus 900 includes a communication interface (e.g., at least one transceiver) 902, a storage medium 904, a user interface 906, a memory device 908, and a processing circuit 910.

These components can be coupled to and/or placed in electrical communication with one another via a signaling bus or other suitable component, represented generally by the connection lines in FIG. 9. The signaling bus may include any number of interconnecting buses and bridges depending on the specific application of the processing circuit 910 and the overall design constraints. The signaling bus links together various circuits such that each of the communication interface 902, the storage medium 904, the user interface 906, and the memory device 908 are coupled to and/or in electrical communication with the processing circuit 910. The signaling bus may also link various other circuits (not shown) such as timing sources, peripherals, voltage regulators, and power management circuits, which are well known in the art, and therefore, will not be described any further.

The communication interface 902 may be adapted to facilitate wireless communication of the apparatus 900. For example, the communication interface 902 may include circuitry and/or programming adapted to facilitate the communication of information bi-directionally with respect to one or more communication devices in a network. In some implementations, the communication interface 902 may be configured for wire-based communication. In some implementations, the communication interface 902 may be coupled to one or more antennas 912 for wireless communication within a wireless communication system. The communication interface 902 can be configured with one or more standalone receivers and/or transmitters, as well as one or more transceivers. In the illustrated example, the communication interface 902 includes a transmitter 914 and a receiver 916.

The memory device 908 may represent one or more memory devices. As indicated, the memory device 908 may maintain scheduling-related information 918 along with other information used by the apparatus 900. In some implementations, the memory device 908 and the storage medium 904 are implemented as a common memory component. The memory device 908 may also be used for storing data that is manipulated by the processing circuit 910 or some other component of the apparatus 900.

The storage medium 904 may represent one or more computer-readable, machine-readable, and/or processor-readable devices for storing programming, such as processor executable code or instructions (e.g., software, firmware), electronic data, databases, or other digital information. The storage medium 904 may also be used for storing data that is manipulated by the processing circuit 910 when executing programming. The storage medium 904 may be any available media that can be accessed by a general purpose or special purpose processor, including portable or fixed storage devices, optical storage devices, and various other mediums capable of storing, containing or carrying programming.

By way of example and not limitation, the storage medium 904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 904 may be embodied in an article of manufacture (e.g., a computer program product). By way of example, a computer program product may include a computer-readable medium in packaging materials. In view of the above, in some implementations, the storage medium 904 may be a non-transitory (e.g., tangible) storage medium.

The storage medium 904 may be coupled to the processing circuit 910 such that the processing circuit 910 can read information from, and write information to, the storage medium 904. That is, the storage medium 904 can be coupled to the processing circuit 910 so that the storage medium 904 is at least accessible by the processing circuit 910, including examples where at least one storage medium is integral to the processing circuit 910 and/or examples where at least one storage medium is separate from the processing circuit 910 (e.g., resident in the apparatus 900, external to the apparatus 900, distributed across multiple entities, etc.).

Programming stored by the storage medium 904, when executed by the processing circuit 910, causes the processing circuit 910 to perform one or more of the various functions and/or process operations described herein. For example, the storage medium 904 may include operations configured for regulating operations at one or more hardware blocks of the processing circuit 910, as well as to utilize the communication interface 902 for wireless communication utilizing their respective communication protocols.

The processing circuit 910 is generally adapted for processing, including the execution of such programming stored on the storage medium 904. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 910 is arranged to obtain, process and/or send data, control data access and storage, issue commands, and control other desired operations. The processing circuit 910 may include circuitry configured to implement desired programming provided by appropriate media in at least one example. For example, the processing circuit 910 may be implemented as one or more processors, one or more controllers, and/or other structure configured to execute executable programming Examples of the processing circuit 910 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 910 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 910 are for illustration and other suitable configurations within the scope of the disclosure are also contemplated.

According to one or more aspects of the disclosure, the processing circuit 910 may be adapted to perform any or all of the features, processes, functions, operations and/or routines for any or all of the apparatuses described herein. For example, the processing circuit 910 may be configured to perform any of the steps, functions, and/or processes described with respect to FIGS. 3-8 and 10. As used herein, the term "adapted" in relation to the processing circuit 910 may refer to the processing circuit 910 being one or more of configured, employed, implemented, and/or programmed to perform a particular process, function, operation and/or routine according to various features described herein.

The processing circuit 910 may be a specialized processor, such as an application specific integrated circuit (ASIC) that serves as a means for (e.g., structure for) carrying out any one of the operations described in conjunction with FIGS. 3-8 and 10. The processing circuit 910 may serve as one example of a means for transmitting and/or a means for receiving.

According to at least one example of the apparatus 900, the processing circuit 910 may include one or more of a circuit/module for sending 920, a circuit/module for communicating 922, a circuit/module for transitioning 924, a circuit/module for receiving 926, a circuit/module for selecting 928, or a circuit/module for prioritizing 930.

The circuit/module for sending 920 may include circuitry and/or programming (e.g., code for sending 932 stored on the storage medium 904) adapted to perform several functions relating to, for example, sending information to another apparatus. Initially, the circuit/module for sending 920 obtains the information to be sent (e.g., from the memory device 908, or some other component). In some implementations, the information to be sent may include an indication of a frame structure supported by an access terminal for a first power mode of a plurality of power modes. In some implementations, the information to be sent may include an indication that the access terminal supports selection of frame structure for different ones of the plurality of power modes. In some implementations, the information to be sent may include an indication that the access terminal supports selection of modulation and coding scheme (MCS) for different ones of the plurality of power modes. In some implementations, the information to be sent may include an indication that the access terminal supports selection of multiple input multiple output (MIMO) transmission mode for different ones of the plurality of power modes. In some implementations, the information to be sent may include an indication that the access terminal supports selection of carrier aggregation level for different ones of the plurality of power modes. In some implementations, the information to be sent may include an indication that the access terminal supports, for different ones of the plurality of power modes, at least one of: different convolutional coding schemes; different antenna selections; dynamic switching between reduced hybrid automatic repeat request (H-ARQ) signaling and normal H-ARQ signaling; dynamic switching between low power discontinuous reception (DRX) and normal DRX; or enhanced microsleep. In some implementations, the information to be sent may include an acknowledgement that is sent in response to receipt of a request.

The circuit/module for sending 920 may format the information to be sent (e.g., in a message, according to a protocol, etc.). In some scenarios, the circuit/module for sending 920 causes the information to be sent via a wireless communication medium. To this end, the circuit/module for sending 920 may send the data to the communication interface 902 (e.g., to the transmitter 914) or some other component for transmission. In some implementations, the communication interface 902 includes the circuit/module for sending 920 and/or the code for sending 932.

The circuit/module for communicating 922 may include circuitry and/or programming (e.g., code for communicating 934 stored on the storage medium 904) adapted to perform several functions relating to, for example, communicating information. In some implementations, communicating information involves sending information (e.g., as described herein). In some implementations, communicating information involves receiving information (e.g., as described herein). In some implementations, the information to be communicated may include a request for the access terminal to switch to the first power mode. In some implementations, the information to be communicated may include at least one indication of a plurality of power saving features. In some implementations, the information to be communicated may include at least one indication of a plurality of power saving features and at least one indication of potential power saving associated with the power saving features. In some implementations, the information to be communicated may include a request for the access terminal to switch from the first power mode to a second power mode. In some implementations, the communication interface 902 includes the circuit/module for communicating 922 and/or the code for communicating 934.

In some implementations, the communicating involves the circuit/module for communicating 922 receiving information directly from a device that transmitted the information or receiving information from a component of the apparatus 900 (e.g., the receiver 916, the memory device 908, or some other component). In this case, the circuit/module for communicating 922 may process (e.g., decode) the received information. The circuit/module for communicating 922 then outputs the received information to a component of the apparatus 900 (e.g., the memory device 908, the circuit/module for transitioning 924, or some other component).

In some implementations, the communicating involves sending information to another component of the apparatus 900 (e.g., the transmitter 914) for transmission to another device or sending information directly to an ultimate destination (e.g., if the circuit/module for communicating 922 includes a transmitter). In this case, the circuit/module for communicating 922 initially obtains information to be communicated. The circuit/module for communicating 922 may process (e.g., encode) the information to be transmitted. The circuit/module for communicating 922 then causes the information to be transmitted. For example, the circuit/module for communicating 922 can directly transmit the information or pass the information to the transmitter 914 for subsequent radio frequency (RF) transmission.

The circuit/module for transitioning 924 may include circuitry and/or programming (e.g., code for transitioning 936 stored on the storage medium 904) adapted to perform several functions relating to, for example, transitioning to a particular power mode (e.g., the first power mode, a second power mode, etc.). Initially, the circuit/module for transitioning 924 receives a signal (e.g., an indication) that triggers the transition (e.g., from the circuit/module for communicating 922, the memory device 908, the communication interface 902, or some other component). In some implementations, a transition to the first power mode results from the communication of a request (e.g., by the circuit/module for communicating 922). In some implementations, a transition to the first power mode is triggered as a result of the sending of an acknowledgement (e.g., by the circuit/ module for communicating 922 or the circuit/module for sending 920). In some implementations, a transition to the first power mode is triggered as a result of the receipt of an acknowledgement (e.g., by the circuit/module for communicating 922 or the circuit/module for receiving 926). In some implementations, a transition to a second power mode results from the communication of a request (e.g., by the circuit/module for communicating 922).

The circuit/module for receiving 926 may include circuitry and/or programming (e.g., code for receiving 938 stored on the storage medium 904) adapted to perform several functions relating to, for example, receiving information. In some implementations, the information may include an acknowledgement to a request. Initially, the circuit/module for receiving 926 obtains the information directly from a device (e.g., a base station) that transmitted the information or from a component of the apparatus 900 (e.g., the receiver 916, the memory device 908, or some other component). In some implementations, the circuit/module for receiving 926 identifies a memory location of a value in the memory device 908 and invokes a read of that location. In some implementations, the circuit/module for receiving 926 processes (e.g., decodes) the obtained information. The circuit/module for receiving 926 then outputs the information to a component of the apparatus 900 (e.g., to the memory device 908, the circuit/module for transitioning 924, or some other component). In some implementations, the receiver 916 includes the circuit/module for receiving 926 and/or the code for receiving 938.

The circuit/module for selecting 928 may include circuitry and/or programming (e.g., code for selecting 940 stored on the storage medium 904) adapted to perform several functions relating to, for example, selecting at least one power saving feature for a power mode. In some implementations, the power mode is the first power mode (e.g., a low power mode). Initially, the circuit/module for selecting 928 obtains indications of a plurality of power modes. For example, the circuit/module for selecting 928 may obtain this information from a component of the apparatus 900 (e.g., from the memory device 908, the communication interface 902, or some other component) or directly from an entity that maintains the information. In some implementations, the circuit/module for selecting 928 obtains this information from a database (e.g., a network database or a database local to the apparatus 900). The circuit/module for selecting 928 then selects one or more of the power saving features based on one or more criterion (e.g., based on a traffic type to be communicated). The circuit/module for selecting 928 may then output an indication of the selection to a component of the apparatus 900 (e.g., the memory device 908, the circuit/module for prioritizing 930, or some other component).

The circuit/module for prioritizing 930 may include circuitry and/or programming (e.g., code for prioritizing 942 stored on the storage medium 904) adapted to perform several functions relating to, for example, prioritizing power saving features. In some implementations, the prioritization is based on at least one indication of potential power saving associated with power saving features. Initially, the circuit/module for prioritizing 930 obtains the indication(s) of potential power saving. For example, the circuit/module for prioritizing 930 may obtain this information from a component of the apparatus 900 (e.g., from the memory device 908, the communication interface 902, or some other component) or directly from an entity that maintains the information. In some implementations, the circuit/module for prioritizing 930 obtains this information from a database (e.g., a network database or a database local to the apparatus 900). The circuit/module for prioritizing 930 then prioritizes the power saving features (e.g., based on a fairness criterion, potential power savings, the amount of power savings, impact on traffic QoS, etc.). The circuit/module for prioritizing 930 may then output an indication of the prioritization to a component of the apparatus 900 (e.g., the memory device 908, the circuit/module for communicating 922, the circuit/module for transitioning 924, or some other component).

As mentioned above, programming stored by the storage medium 904, when executed by the processing circuit 910, causes the processing circuit 910 to perform one or more of the various functions and/or process operations described herein. For example, the storage medium 904 may include one or more of the code for sending 932, the code for communicating 934, the code for transitioning 936, the code for receiving 938, the code for selecting 940, or the code for prioritizing 942.

Example Process

Figure 10:
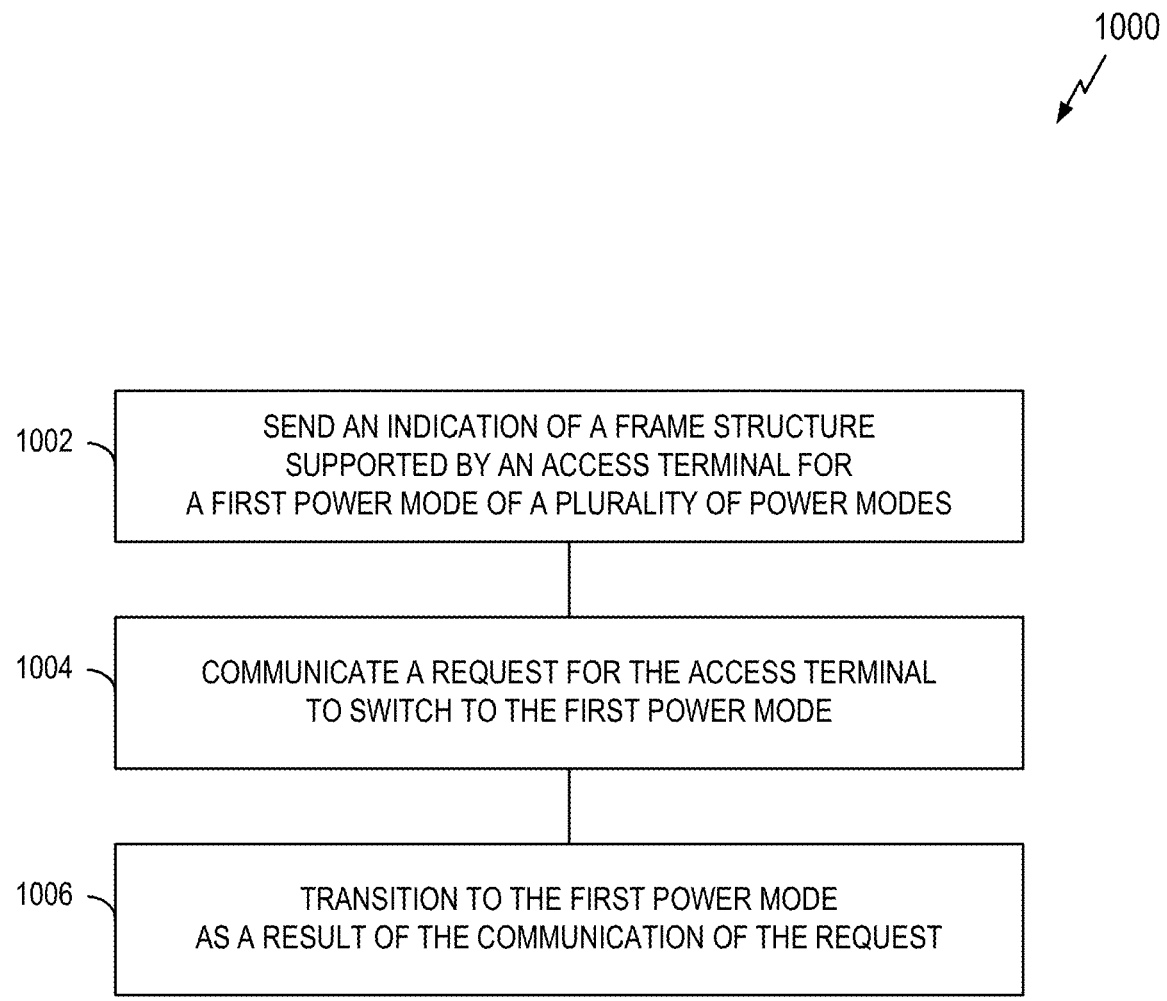
FIG. 10 illustrates an example of a process for transitioning between power modes in accordance with some aspects of the disclosure.

FIG. 10 illustrates a process 1000 for supporting scheduling in accordance with some aspects of the disclosure. The process 1000 may take place within a processing circuit (e.g., the processing circuit 910 of FIG. 9), which may be located in an access terminal, a base station, or some other suitable apparatus. Of course, in various aspects within the scope of the disclosure, the process 1000 may be implemented by any suitable apparatus capable of supporting scheduling-related operations.

At block 1002, an apparatus (e.g., an access terminal) sends an indication of a frame structure supported by an access terminal for a first power mode of a plurality of power modes. For example, a UE may send this information to an eNB via a UE capability message.

In some aspects, the plurality of power modes include a low power mode and a normal power mode. The low power mode may be associated with lower power consumption than the normal power mode. In some implementations, the first power mode is the low power mode.

The access terminal may support different types of frame structures. In some aspects, the access terminal supports another frame structure for a second power mode of the plurality of power modes; and the frame structure supported by the access terminal for the first power mode specifies a first bandwidth allocation that is smaller than a second bandwidth allocation specified by the other frame structure. In some aspects, the access terminal supports another frame structure for a second power mode of the plurality of power modes; and the frame structure supported by the access terminal for the first power mode specifies a first transmission time interval (TTI) that is shorter than a second TTI specified by the other frame structure.

The frame structure supported by the access terminal for the first power mode may support various operations for the first power mode. In some aspects, the frame structure supported by the access terminal for the first power mode supports dynamic bandwidth switching for control and data multiplexing. In some aspects, the frame structure supported by the access terminal for the first power mode supports narrowband control and data transmission.

The apparatus may optionally send at least one indication of other capability or configuration of the access terminal. Several examples of the sending of such an indication follow. In some aspects, the process 1000 includes sending an indication that the access terminal further supports selection of frame structure for different ones of the plurality of power modes. In some aspects, the process 1000 includes sending an indication that the access terminal further supports selection of modulation and coding scheme (MCS) for different ones of the plurality of power modes. In some aspects, the process 1000 includes sending an indication that the access terminal further supports selection of multiple input multiple output (MIMO) transmission mode for different ones of the plurality of power modes. In some aspects, the process 1000 includes sending an indication that the access terminal further supports selection of carrier aggregation level for different ones of the plurality of power modes. In some aspects, the process 1000 includes sending an indication that the access terminal further supports, for different ones of the plurality of power modes, at least one of: different convolutional coding schemes; different antenna selections; dynamic switching between reduced hybrid automatic repeat request (H-ARQ) signaling and normal H-ARQ signaling; dynamic switching between low power discontinuous reception (DRX) and normal DRX, or enhanced microsleep.

At block 1004, the apparatus communicates (e.g., sends or receives) a request for the access terminal to switch to the first power mode.

In some aspects, the communication of the request includes sending the request. For example, a UE may transmit such a request to an eNB. In this case, an acknowledgement (e.g., a positive acknowledgement or a negative acknowledgement) to the request may be received (e.g., from an eNB) in response to the request.

In some aspects, the communication of the request includes receiving the request. For example, a UE may receive such a request from an eNB. In this case, an acknowledgement (e.g., a positive acknowledgement or a negative acknowledgement) may be transmitted in response to the receipt of the request. For example, the UE may transmit an acknowledgement to the eNB.

At block 1006, the apparatus transitions to the first power mode as a result of the communication of the request at block 1004. In some aspects, this transition to the first power mode may be triggered as a result of sending the request or receiving the request.

In scenarios where the communicating of the request at block 1004 involves receiving the request and an acknowledgement is sent in response to the receipt of the request, the transition to the first power mode may be triggered as a result of the sending of the acknowledgement.

In scenarios where the communicating of the request at block 1004 involves sending the request and an acknowledgement to the request is received, the transition to the first power mode may be triggered as a result of the receipt of the acknowledgement.

In some aspects, the transition to the low power mode may be triggered based on at least one criterion. In some aspects, the at least one criterion may include at least one of: a battery level, an application requirement, a traffic requirement, access terminal context, or access terminal usage.

In some aspects, the process 1000 further includes communicating at least one indication of a plurality of power saving features; and selecting at least one of the power saving features for the first power mode. In this case, the selection may be based on power saving effectiveness.

In some aspects, the process 1000 further includes communicating at least one indication of a plurality of power saving features and at least one indication of potential power saving associated with the power saving features; and prioritizing the power saving features based on the at least one indication of potential power saving.

In some aspects, the process 1000 further includes communicating another request for the access terminal to switch from the first power mode to a second power mode; and transitioning to the second power mode as a result of the communication of the other request.

Second Example Apparatus

Figure 11:
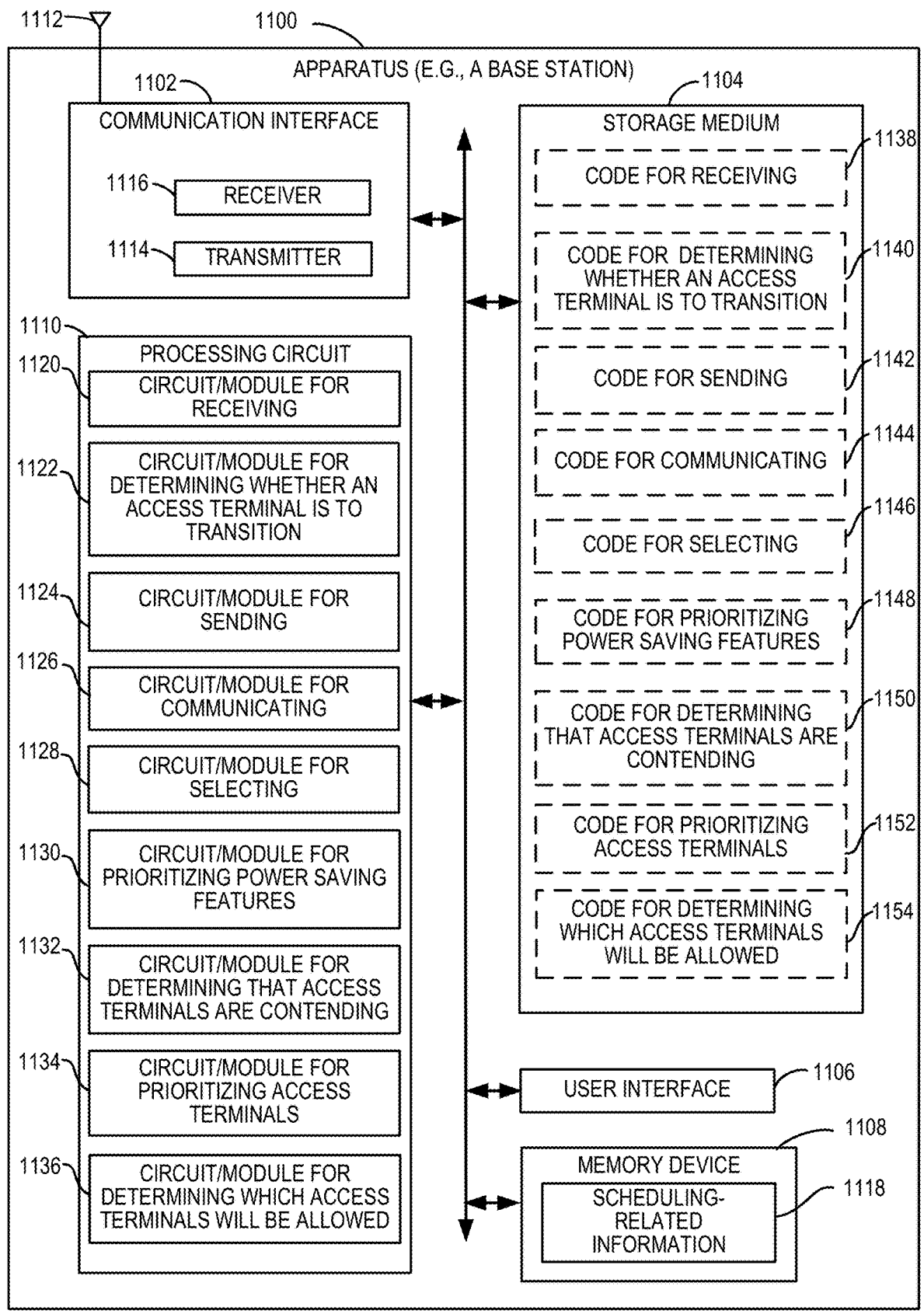
FIG. 11 illustrates a block diagram of an example hardware implementation for another apparatus (e.g., an electronic device) that can support scheduling in accordance with some aspects of the disclosure.

FIG. 11 is an illustration of an apparatus 1100 that may support scheduling according to one or more aspects of the disclosure. The apparatus 1100 could embody or be implemented within an access point, a mobile device, a network node, or some other type of device that supports wireless communication. In various implementations, the apparatus 1100 could embody or be implemented within a base station, an access terminal, a network node, or some other type of device. In various implementations, the apparatus 1100 could embody or be implemented within a mobile phone, a smart phone, a tablet, a portable computer, a server, a personal computer, a sensor, an entertainment device, a medical device, or any other electronic device having circuitry.

The apparatus 1100 includes a communication interface (e.g., at least one transceiver) 1102, a storage medium 1104, a user interface 1106, a memory device 1108 (e.g., storing scheduling-related information 1118), and a processing circuit (e.g., at least one processor) 1110. In various implementations, the user interface 1106 may include one or more of: a keypad, a display, a speaker, a microphone, a touchscreen display, of some other circuitry for receiving an input from or sending an output to a user. The communication interface 1102 may be coupled to one or more antennas 1112, and may include a transmitter 1114 and a receiver 1116. In general, the components of FIG. 11 may be similar to corresponding components of the apparatus 900 of FIG. 9.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 3-8 and 12. As used herein, the term "adapted" in relation to the processing circuit 1110 may refer to the processing circuit 1110 being one or more of configured, employed, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described in conjunction with FIGS. 3-8 and 12. The processing circuit 1110 may serve as one example of a means for transmitting and/or a means for receiving.

According to at least one example of the apparatus 1100, the processing circuit 1110 may include one or more of a circuit/module for receiving 1120, a circuit/module for determining whether an access terminal is to transition 1122, a circuit/module for sending 1124, a circuit/module for communicating 1126, a circuit/module for selecting 1128, a circuit/module for prioritizing power saving features 1130, a circuit/module for determining that access terminals are contending 1132, a circuit/module for prioritizing access terminals 1134, or a circuit/module for determining which access terminals will be allowed 1136.

The circuit/module for receiving 1120 may include circuitry and/or programming (e.g., code for receiving 1138 stored on the storage medium 1104) adapted to perform several functions relating to, for example, receiving information. In some implementations, the information may include an indication of a frame structure supported by an access terminal for a first power mode of a plurality of power modes. In some implementations, the information may include a request from the access terminal to transition to the first power mode. In some implementations, the information may include an indication that the access terminal supports selection of frame structure for different ones of the plurality of power modes. In some implementations, the information may include an indication that the access terminal supports selection of modulation and coding scheme (MCS) for different ones of the plurality of power modes. In some implementations, the information may include an indication that the access terminal supports selection of multiple input multiple output (MIMO) transmission mode for different ones of the plurality of power modes. In some implementations, the information may include an indication that the access terminal supports selection of carrier aggregation level for different ones of the plurality of power modes. In some implementations, the information may include an indication that the access terminal supports, for different ones of the plurality of power modes, at least one of: different convolutional coding schemes; different antenna selections; dynamic switching between reduced hybrid automatic repeat request (H-ARQ) signaling and normal H-ARQ signaling; dynamic switching between low power discontinuous reception (DRX) and normal DRX; or enhanced microsleep.

The circuit/module for receiving 1120 may obtain the information directly from a device (e.g., an access terminal) that transmitted the information or from a component of the apparatus 1100 (e.g., the receiver 1116, the memory device 1108, or some other component). In some implementations, the circuit/module for receiving 1120 identifies a memory location of a value in the memory device 1108 and invokes a read of that location. In some implementations, the circuit/module for receiving 1120 processes (e.g., decodes) the obtained information. The circuit/module for receiving 1120 then outputs the information to a component of the apparatus 1100 (e.g., to the memory device 1108, the circuit/module for determining whether an access terminal is to transition 1122, or some other component). In some implementations, the receiver 1116 includes the circuit/module for receiving 1120 and/or the code for receiving 1138.

The circuit/module for determining whether an access terminal is to transition 1122 may include circuitry and/or programming (e.g., code for determining whether an access terminal is to transition 1140 stored on the storage medium 1104) adapted to perform several functions relating to, for example, determining whether an access terminal is to transition (e.g., determining whether to allow the access terminal to transition) to a particular power mode (e.g., the first power mode, a second power mode, etc.). In some scenarios, this determination is triggered by receipt of a request from an access terminal to transition to the first power mode (e.g., as received by the circuit/module for receiving 1120, or some other component).

The circuit/module for determining whether an access terminal is to transition 1122 may obtain (e.g., from the circuit/module for communicating 1122, the memory device 1108, the communication interface 1102, or some other component) at least one criterion that controls the transition. In some implementations, the at least one criterion relates to at least one of: a quantity of access terminals currently operating in the first power mode, traffic loading, time of day, or resource availability at an access point. For example, as discussed herein, a transition to the first power mode may be triggered, allowed, or disallowed based on how may access terminals currently served by an eNB are in the first power mode, etc. In some aspects, an eNB may be aware of a UE's sleep capabilities (and latencies) and thereby schedule the UE in a way that would be more energy efficient while still meeting QoS/latency requirements (e.g., by scheduling the UE to sleep for a number of subframes and guaranteeing that the UE does not need to check for a subsequent allocation for the specified number of subframes). Through the use of pre-scheduling (and semi-persistent scheduling), a UE can know the schedule in advance (e.g., in contrast to a timer-based scheme). Therefore, more blocks of time can be scheduled for low power mode, and this scheduling can be performed earlier. Also, a UE can be scheduled to go to sleep immediately (e.g., in contrast to a timer-based scheme), if desired. The circuit/module for determining whether an access terminal is to transition 1122 then outputs an indication of the determination to a component of the apparatus 1100 (e.g., to the memory device 1108, the circuit/module for sending 1124, or some other component).

The circuit/module for sending 1124 may include circuitry and/or programming (e.g., code for sending 1142 stored on the storage medium 1104) adapted to perform several functions relating to, for example, sending information to another apparatus. Initially, the circuit/module for sending 1124 obtains the information to be sent (e.g., from the memory device 1108, or some other component). In some implementations, the information to be sent may include a message indicative of the determination made by the circuit/module for determining whether an access terminal is to transition 1122. In some implementations, the information to be sent may include a message indicative of a determination of whether the access terminal is to transition from the first power mode to a second power mode (e.g., based on an indication from the circuit/module for determining whether an access terminal is to transition 1122).

The circuit/module for sending 1124 may format the information to be sent (e.g., in a message, according to a protocol, etc.). In some scenarios, the circuit/module for sending 1124 causes the information to be sent via a wireless communication medium. To this end, the circuit/module for sending 1124 may send the data to the communication interface 1102 (e.g., to the transmitter 1114) or some other component for transmission. In some implementations, the communication interface 1102 includes the circuit/module for sending 1124 and/or the code for sending 1142.

The circuit/module for communicating 1126 may include circuitry and/or programming (e.g., code for communicating 1144 stored on the storage medium 1104) adapted to perform several functions relating to, for example, communicating information. In some implementations, communicating information involves sending information (e.g., as described herein). In some implementations, communicating information involves receiving information (e.g., as described herein). In some implementations, the information to be communicated may include at least one indication of a plurality of power saving features. In some implementations, the information to be communicated may include at least one indication of potential power saving associated with the plurality of power saving features. In some implementations, the information to be communicated may include at least one indication of a plurality of power saving features and at least one indication of potential power saving associated with the power saving features. In some implementations, the communication interface 1102 includes the circuit/module for communicating 1126 and/or the code for communicating 1144.

In some implementations, the communicating involves the circuit/module for communicating 1126 receiving information directly from a device that transmitted the information or receiving information from a component of the apparatus 1100 (e.g., the receiver 1116, the memory device 1108, or some other component). In this case, the circuit/module for communicating 1126 may process (e.g., decode) the received information. The circuit/module for communicating 1126 then outputs the received information to a component of the apparatus 1100 (e.g., the memory device 1108, the circuit/module for selecting 1128, the circuit/module for prioritizing power saving features 1130, or some other component).

In some implementations, the communicating involves sending information to another component of the apparatus 1100 (e.g., the transmitter 1114) for transmission to another device or sending information directly to an ultimate destination (e.g., if the circuit/module for communicating 1126 includes a transmitter). In this case, the circuit/module for communicating 1126 initially obtains information to be communicated. The circuit/module for communicating 1126 may process (e.g., encode) the information to be transmitted. The circuit/module for communicating 1126 then causes the information to be transmitted. For example, the circuit/module for communicating 1126 can directly transmit the information or pass the information to the transmitter 1114 for subsequent radio frequency (RF) transmission.

The circuit/module for selecting 1128 may include circuitry and/or programming (e.g., code for selecting 1146 stored on the storage medium 1104) adapted to perform several functions relating to, for example, selecting at least one power saving feature for a power mode. In some implementations, the power mode is the first power mode (e.g., a low power mode). Initially, the circuit/module for selecting 1128 obtains indications of a plurality of power modes. For example, the circuit/module for selecting 1128 may obtain this information from a component of the apparatus 1100 (e.g., from the memory device 1108, the circuit/module for communicating 1126, the communication interface 1102, or some other component) or directly from an entity that maintains the information. In some implementations, the circuit/module for selecting 1128 obtains this information from a database (e.g., a network database or a database local to the apparatus 1100). The circuit/module for selecting 1128 then selects one or more of the power saving features based on one or more criterion (e.g., based on the amount of power savings a given feature provides for the access terminals being served by an eNB). The circuit/module for selecting 1128 may then output an indication of the selection to a component of the apparatus 1100 (e.g., the memory device 1108, the circuit/module for prioritizing power saving features 1130, or some other component).

The circuit/module for prioritizing power saving features 1130 may include circuitry and/or programming (e.g., code for prioritizing power saving features 1148 stored on the storage medium 1104) adapted to perform several functions relating to, for example, prioritizing power saving features. In some implementations, the prioritization is based on at least one indication of potential power saving associated with power saving features. Initially, the circuit/module for prioritizing power saving features 1130 obtains the indication(s) of potential power saving. For example, the circuit/module for prioritizing power saving features 1130 may obtain this information from a component of the apparatus 1100 (e.g., from the memory device 1108, the circuit/module for communicating 1126, the communication interface 1102, or some other component) or directly from an entity that maintains the information. In some implementations, the circuit/module for prioritizing power saving features 1130 obtains this information from a database (e.g., a network database or a database local to the apparatus 1100). The circuit/module for prioritizing power saving features 1130 then prioritizes the power saving features (e.g., based on the amount of power savings, impact on traffic QoS, etc.). The circuit/module for prioritizing power saving features 1130 may then output an indication of the prioritization to a component of the apparatus 1100 (e.g., the memory device 1108, the circuit/module for communicating 1122, the circuit/module for determining which access terminals will be allowed 1136, or some other component).

The circuit/module for determining that access terminals are contending 1132 may include circuitry and/or programming (e.g., code for determining that access terminals are contending 1150 stored on the storage medium 1104) adapted to perform several functions relating to, for example, determining that a plurality of access terminals are contending to operate in a particular power mode (e.g., the first power mode, a second power mode, etc.). Initially, the circuit/module for determining that access terminals are contending 1132 obtains information (e.g., requests to transition to the first power mode) that indicates that access terminals are contending (e.g., from the circuit/module for communicating 1126, the memory device 1108, the communication interface 1102, or some other component). The circuit/module for determining that access terminals are contending 1132 then outputs an indication of the determination to a component of the apparatus 1100 (e.g., to the memory device 1108, the circuit/module for prioritizing access terminals 1134, or some other component).

The circuit/module for prioritizing access terminals 1134 may include circuitry and/or programming (e.g., code for prioritizing access terminals 1152 stored on the storage medium 1104) adapted to perform several functions relating to, for example, assigning a priority to access terminals. In some implementations, the prioritization is based on at least one of: a fairness criterion or potential power savings. Initially, the circuit/module for prioritizing access terminals 1134 obtains a list of access terminals (e.g., access terminals currently being served and/or to be served by an eNB) and information about the access terminals (e.g., the types of traffic carried by the access terminals, power consumption of the access terminals in different power modes, previously assigned priority information, etc.). The circuit/module for prioritizing access terminals 1134 may obtain this information from a component of the apparatus 1100 (e.g., from the memory device 1108, the communication interface 1102, the circuit/module for determining that access terminals are contending 1132, or some other component) or directly from an entity that maintains the information. In some implementations, the circuit/module for prioritizing access terminals 1134 obtains this information from a database (e.g., a network database or a database local to the apparatus 1100). The circuit/module for prioritizing access terminals 1134 then prioritizes the access terminals (e.g., based on the above criteria). The circuit/module for prioritizing access terminals 1134 may then output an indication of the prioritization to a component of the apparatus 1100 (e.g., the memory device 1108, the circuit/module for communicating 1122, the circuit/module for determining which access terminals will be allowed 1136, or some other component).

The circuit/module for determining which access terminals will be allowed 1136 may include circuitry and/or programming (e.g., code for determining which access terminals will be allowed 1154 stored on the storage medium 1104) adapted to perform several functions relating to, for example, determining which access terminals will be allowed to operate in a particular power mode (e.g., the first power mode, a second power mode, etc.) based on prioritization of the access terminals. Initially, the circuit/module for determining which access terminals will be allowed 1136 obtains prioritization information (e.g., from the circuit/module for prioritizing access terminals 1134, the memory device 1108, or some other component). The circuit/module for determining which access terminals will be allowed 1136 selects one or more access terminals based on this prioritization (e.g., subject to a maximum number of allowed access terminals or some other criteria as discussed herein). The circuit/module for determining which access terminals will be allowed 1136 then outputs an indication of the determination to a component of the apparatus 1100 (e.g., to the memory device 1108, or some other component).

As mentioned above, programming stored by the storage medium 1104, when executed by the processing circuit 1110, causes the processing circuit 1110 to perform one or more of the various functions and/or process operations described herein. For example, the storage medium 1104 may include one or more of the code for receiving 1138, the code for determining whether an access terminal is to transition 1140, the code for sending 1142, the code for communicating 1144, the code for selecting 1146, the code for prioritizing power saving features 1148, the code for determining that access terminals are contending 1150, the code for prioritizing access terminals 1152, or the code for determining which access terminals will be allowed 1154.

Example Process

Figure 12:
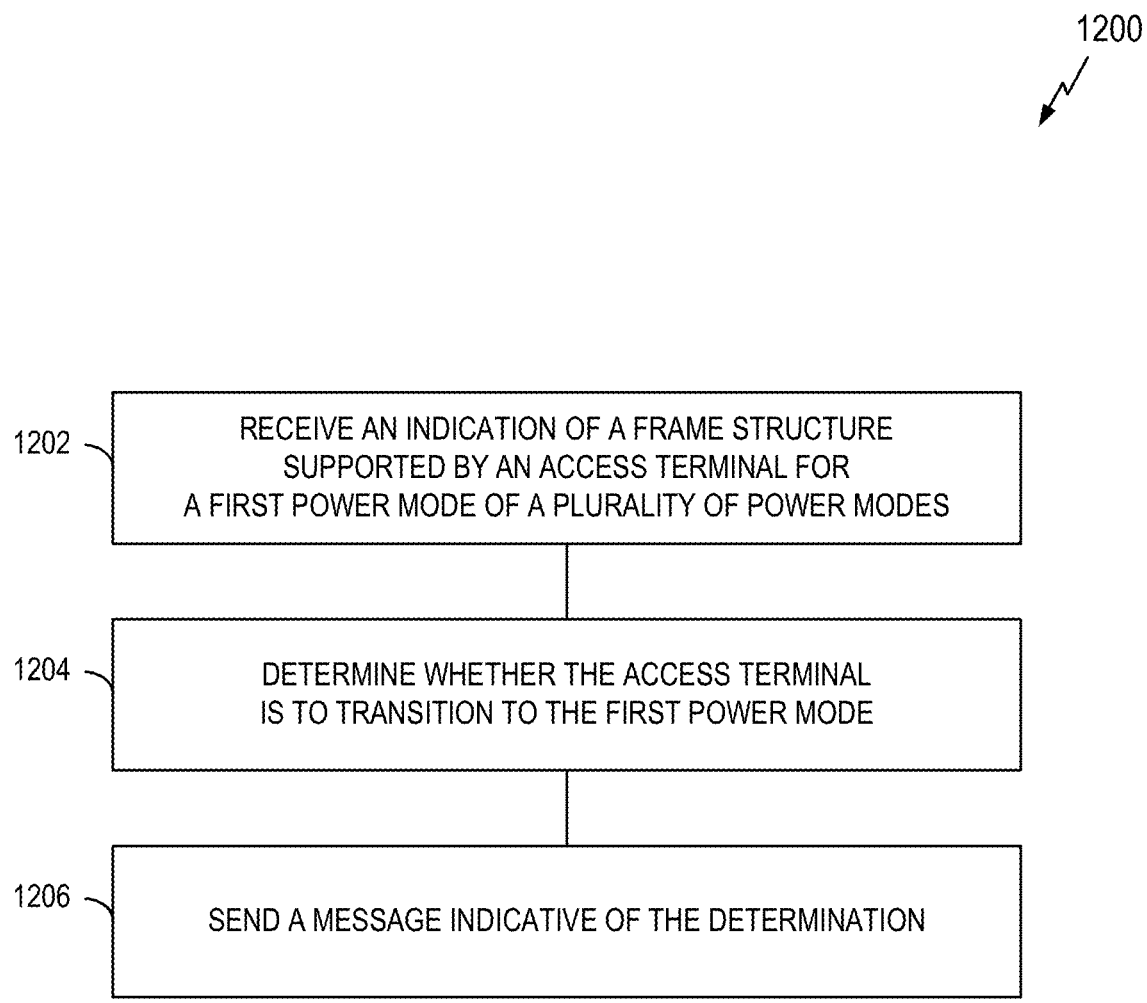
FIG. 12 illustrates an example of a process that supports transitioning between power modes in accordance with some aspects of the disclosure.

FIG. 12 illustrates a process 1200 for supporting scheduling in accordance with some aspects of the disclosure. The process 1200 may take place within a processing circuit (e.g., the processing circuit 1110 of FIG. 11), which may be located in a base station, an access terminal, or some other suitable apparatus. Of course, in various aspects within the scope of the disclosure, the process 1200 may be implemented by any suitable apparatus capable of supporting scheduling-related operations.

At block 1202, an apparatus (e.g., an eNB) receives an indication of a frame structure supported by an access terminal (e.g., a UE) for a first power mode of a plurality of power modes. For example, an eNB may receive this information via a UE capability message.

In some aspects, the plurality of power modes include a low power mode and a normal power mode. The low power mode may be associated with lower power consumption than the normal power mode. In some implementations, the first power mode is the low power mode.

The access terminal may support different types of frame structures. In some aspects, the access terminal supports another frame structure for a second power mode of the plurality of power modes; and the frame structure supported by the access terminal for the first power mode specifies a first bandwidth allocation that is smaller than a second bandwidth allocation specified by the other frame structure. In some aspects, the access terminal supports another frame structure for a second power mode of the plurality of power modes; and the frame structure supported by the access terminal for the first power mode specifies a first transmission time interval (TTI) that is shorter than a second TTI specified by the other frame structure.

The frame structure supported by the access terminal for the first power mode may support various operations for the first power mode. In some aspects, the frame structure supported by the access terminal for the first power mode supports dynamic bandwidth switching for control and data multiplexing. In some aspects, the frame structure supported by the access terminal for the first power mode supports narrowband control and data transmission.

The apparatus may receive at least one indication of other capability or configuration of the access terminal. The apparatus may use such an indication to determine how to communicate with the access terminal (e.g., in support of a low power mode of operation). Several examples of the receipt of such an indication follow. In some aspects, the process 1000 includes receiving an indication that the access terminal further supports selection of frame structure for different ones of the plurality of power modes. In some aspects, the process 1000 includes receiving an indication that the access terminal further supports selection of modulation and coding scheme (MCS) for different ones of the plurality of power modes. In some aspects, the process 1000 includes receiving an indication that the access terminal further supports selection of multiple input multiple output (MIMO) transmission mode for different ones of the plurality of power modes. In some aspects, the process 1000 includes receiving an indication that the access terminal further supports selection of carrier aggregation level for different ones of the plurality of power modes. In some aspects, the process 1000 includes receiving an indication that the access terminal further supports, for different ones of the plurality of power modes, at least one of: different convolutional coding schemes; different antenna selections; dynamic switching between reduced hybrid automatic repeat request (H-ARQ) signaling and normal H-ARQ signaling; dynamic switching between low power discontinuous reception (DRX) and normal DRX; or enhanced microsleep.

At block 1204, the apparatus determines whether the access terminal is to transition to the first power mode. In some cases, this determination is made unilaterally by the apparatus. In some cases, this determination is made in response to a request from the access terminal.

In some aspects, the determination is based on at least one of: a quantity of access terminals currently operating in the first power mode, traffic loading, time of day, or resource availability at an access point (e.g., at a base station such as an eNB).

In some aspects, the process 1200 may further include determining that a plurality of access terminals are contending to operate in the first power mode; prioritizing the access terminals; and determining which of the access terminals will be allowed to operate in the first power mode based on the prioritization. Here, the prioritization may be based on at least one of: a fairness criterion or potential power saving.

At block 1206, the apparatus sends (e.g., transmits) a message indicative of the determination of block 1204. For example, the message may be a request from an eNB to a UE or an acknowledgement of a request received by an eNB from a UE.

In some aspects, the message includes a request to the access terminal to transition to the first power mode. For example, an eNB may trigger a transition to a low power mode at a UE (e.g., due to signaling conditions in a cell).

In some aspects, the process 1200 may further include receiving a request from the access terminal to transition to the first power mode (e.g., a UE is requesting that it be allowed to operate in a low power mode). In this case, the determination of block 1204 may be performed as a result of the receipt of the request. In addition, the message sent at block 1206 may include a positive or negative acknowledgement of the request.

In some aspects, the process 1200 may further include communicating (e.g., sending or receiving) at least one indication of a plurality of power saving features, and selecting at least one of the power saving features for the first power mode. Here, the plurality of power saving features may include at least one of: a frame structure, a frame structure for dynamic bandwidth switching for control and data multiplexing, a frame structure for narrowband control and data transmission, a modulation and coding scheme, a convolutional coding scheme, antenna selection, multiple input multiple output (MIMO) transmission mode, non-MIMO transmission mode, carrier aggregation, no carrier aggregation, reduced hybrid automatic repeat request (H-ARQ) signaling, low power discontinuous reception (DRX), or enhanced microsleep. Also, in this case, the process 1200 may further include communicating at least one indication of potential power saving associated with the plurality of power saving features.

In some aspects, the process 1200 may further include communicating (e.g., sending or receiving) at least one indication of a plurality of power saving features and at least one indication of potential power saving associated with the power saving features; and prioritizing the power saving features based on the at least one indication of potential power saving.

In some aspects, the process 1200 may further include determining whether the access terminal is to transition from the first power mode to a second power mode; and sending a message indicative of the determination of whether the access terminal is to transition from the first power mode to the second power mode.

Example Network

Figure 13:
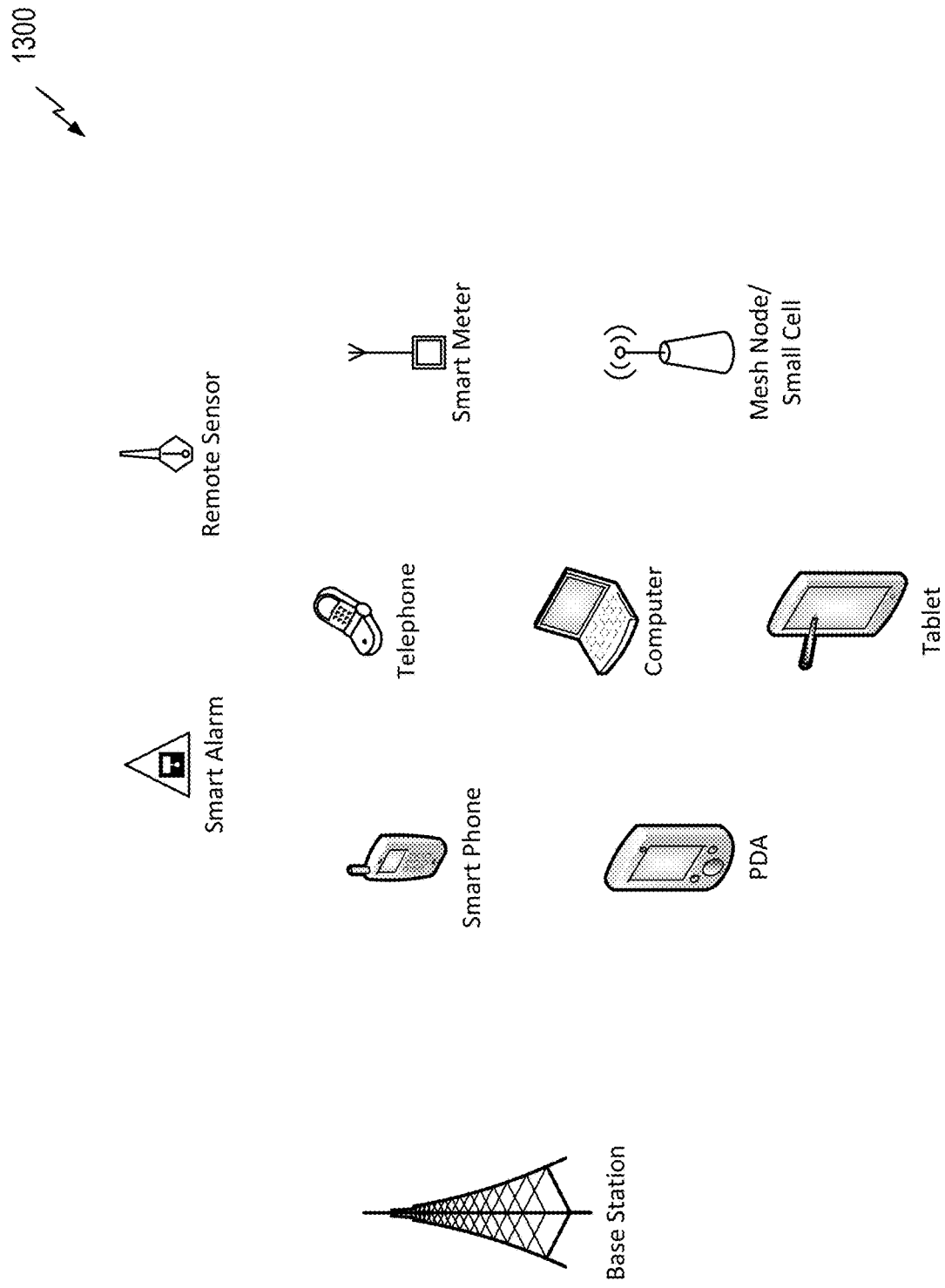
FIG. 13 is a schematic diagram of a wireless communication network within which one or more aspects of the disclosure may be implemented.

FIG. 13 is a schematic illustration of a wireless communication network 1300 including multiple communication entities as it may appear in some aspects of the disclosure. As described herein, a scheduling entity or an entity being scheduled (e.g., as illustrated in FIG. 1 or FIG. 2) may reside in, or be a part of, a base station, a smart phone, a small cell, or other entity. Subordinate entities or mesh nodes may reside in, or be a part of, a smart alarm, a remote sensor, a smart phone, a telephone, a smart meter, a PDA, a personal computer, a mesh node, and/or a tablet computer. Of course, the illustrated devices or components are merely examples, and any suitable node or device may appear within a wireless communication network within the scope of the present disclosure.

ADDITIONAL ASPECTS

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method of wireless communication by a user equipment (UE), comprising:
    sending an indication to a base station that the UE supports, for different ones of a plurality of power modes supported by the UE, an enhanced microsleep mode, wherein the enhanced microsleep mode enables the UE to enter a sleep mode for one or more transmission time intervals (TTIs) during which an absence of scheduling for the UE is guaranteed to the UE;
    receiving, from the base station, an indication of the absence of scheduling for the UE for a preselected duration, wherein the indication of the absence of scheduling comprises the preselected duration; and
    ceasing monitoring, immediately after the indication of the absence of scheduling, for control information from the base station for at least the preselected duration.

2. The method of claim 1, wherein the preselected duration corresponds to a duration of a preselected number of slots within a subframe.

3. The method of claim 1, wherein the scheduling comprises semi-persistent scheduling.

4. The method of claim 1, wherein the ceasing monitoring for control information from the base station for at least the preselected duration comprises ceasing monitoring a control channel.

5. The method of claim 1:
    wherein the plurality of power modes supported by the UE comprises a low power mode and a normal power mode where the low power mode is associated with lower power consumption than the normal power mode; and
    wherein the ceasing monitoring for control information from the base station for at least the preselected duration comprises operating the UE in the low power mode.

6. The method of claim 5, further comprising:
    operating the UE in the normal power mode after the preselected duration.

7. The method of claim 1, further comprising:
    sending an indication to the base station of a frame structure supported by the UE for a first power mode of the plurality of power modes supported by the UE.

8. The method of claim 7, wherein:
    the UE supports another frame structure for a second power mode of the plurality of power modes; and
    the frame structure supported by the UE for the first power mode specifies a first transmission time interval, TTI, that is shorter than a second TTI specified by the other frame structure.

9. The method of claim 1, further comprising sending an indication to the base station that the UE further supports selection of one of:
    modulation and coding scheme, MCS, for different ones of the plurality of power modes supported by the UE;
    multiple input multiple output, MIMO, transmission mode for different ones of the plurality of power modes; and
    carrier aggregation level for different ones of the plurality of power modes.

10. The method of claim 1, further comprising sending an indication to the base station that the UE further supports, for different ones of the plurality of power modes supported by the UE, at least one of:
    different convolutional coding schemes; or different antenna selections.

11. The method of claim 1, further comprising:
sending, to the base station prior to receiving the indication of the absence of scheduling for the UE for the preselected duration, a minimum sleep duration of the UE; and
wherein the preselected duration is equal to or greater than the minimum sleep duration.

12. The method of claim 1:
wherein the plurality of power modes supported by the UE comprises a low power mode and a normal power mode where the low power mode is associated with lower power consumption than the normal power mode; and
wherein the ceasing monitoring for control information from the base station for at least the preselected duration comprises operating the UE in the low power mode;
the method further comprising:
receiving, from the base station and after receiving the indication of the absence of scheduling for the UE for the preselected duration, a request to transition the UE to the normal power mode; and
sending an indication to the base station that the UE declined the request to transition the UE to the normal power mode.

13. A user equipment (UE) for wireless communication, comprising:
a memory device;
one or more processors coupled to the memory device, the one or more processors configured to:
send an indication to a base station that the UE supports, for different ones of a plurality of power modes supported by the UE, an enhanced microsleep mode, wherein the enhanced microsleep mode enables the UE to enter a sleep mode for one or more transmission time intervals (TTIs) during which an absence of scheduling for the UE is guaranteed to the UE;
receive, from the base station, an indication of the absence of scheduling for the UE for a preselected duration, wherein the indication of the absence of scheduling comprises the preselected duration; and
cease monitoring, immediately after the indication of the absence of scheduling, for control information from the base station for at least the preselected duration.

14. The UE of claim 13, wherein the preselected duration corresponds to a duration of a preselected number of slots within a subframe.

15. The UE of claim 13, wherein the scheduling comprises semi-persistent scheduling.

16. The UE of claim 13, wherein the one or more processors configured to cease monitoring for control information from the base station for at least the preselected duration are further configured to cease monitoring a control channel.

17. The UE of claim 13:
wherein the plurality of power modes supported by the UE comprises a low power mode and a normal power mode where the low power mode is associated with lower power consumption than the normal power mode; and
wherein the one or more processors configured to cease monitoring for control information from the base station for at least the preselected duration are further configured to operate the UE in the low power mode.

18. The UE of claim 17, wherein the one or more processors are further configured to operate the UE in the normal power mode after the preselected duration.

19. The UE of claim 13, wherein the one or more processors are further configured to:
send an indication to the base station of a frame structure supported by the UE for a first power mode of the plurality of power modes supported by the UE.

20. The UE of claim 19, wherein:
the UE supports another frame structure for a second power mode of the plurality of power modes; and
the frame structure supported by the UE for the first power mode specifies a first transmission time interval, TTI, that is shorter than a second TTI specified by the other frame structure.

21. The UE of claim 13, wherein the one or more processors are further configured to send an indication to the base station that the UE further supports selection of one of:
modulation and coding scheme, MCS, for different ones of the plurality of power modes supported by the UE;
multiple input multiple output, MIMO, transmission mode for different ones of the plurality of power modes; and
carrier aggregation level for different ones of the plurality of power modes.

22. The UE of claim 13, wherein the one or more processors are further configured to send an indication to the base station that the UE further supports, for different ones of the plurality of power modes supported by the UE, at least one of:
different convolutional coding schemes; or different antenna selections.

23. The UE of claim 13, wherein the processing circuit is one or more processors are further configured to:
send, to the base station prior to receiving the indication of the absence of scheduling for the UE for the preselected duration, a minimum sleep duration of the UE; and
wherein the preselected duration is equal to or greater than the minimum sleep duration.

24. The UE of claim 13:
wherein the plurality of power modes supported by the UE comprises a low power mode and a normal power mode where the low power mode is associated with lower power consumption than the normal power mode; and
wherein the one or more processors configured to cease monitoring for control information from the base station for at least the preselected duration are further configured to operate the UE in the low power mode;
wherein the one or more processors are further configured to:
receive, from the base station and after receiving the indication of the absence of scheduling for the UE for the preselected duration, a request to transition the UE to the normal power mode; and
send an indication to the base station that the UE declined the request to transition the UE to the normal power mode.

25. A method for wireless communication at a base station, comprising:
receiving an indication from a user equipment (UE) that the UE supports, for different ones of a plurality of power modes supported by the UE, an enhanced microsleep mode, wherein the enhanced microsleep mode enables the UE to enter a sleep mode for one or more transmission time intervals (TTIs) during which an absence of scheduling for the UE is guaranteed to the UE;

sending an indication to the UE of the absence of scheduling for the UE for a preselected duration, wherein the indication of the absence of scheduling comprises the preselected duration; and ceasing, immediately after sending the scheduling indication, sending control information to the UE for the preselected duration.

26. The method of claim 25, wherein the preselected duration corresponds to a preselected number of slots within a subframe.

27. The method of claim 25, wherein the scheduling comprises semi-persistent scheduling.

28. The method of claim 25, wherein the ceasing, immediately after sending the scheduling indication, sending control information to the UE for the preselected duration comprises ceasing sending control channel information to the UE.

29. The method of claim 25, further comprising receiving an indication of a frame structure supported by the UE for a first power mode of the plurality of power modes supported by the UE.

30. The method of claim 25, further comprising:
receiving, from the UE prior to sending the indication to the UE of the absence of scheduling for the UE for the preselected duration, a minimum sleep duration of the UE; and determining the preselected duration such that the preselected duration is equal to or greater than the minimum sleep duration.

31. The method of claim 25, further comprising:
sending, to the UE after sending the indication to the UE of the absence of scheduling for the UE for the preselected duration, a request to transition the UE from a low power mode to a normal power mode, wherein the low power mode is associated with lower power consumption than the normal power mode; and receiving an indication that the UE declined the request to transition the UE from the low power mode to the normal power mode.

32. A base station for wireless communication, comprising:
a memory device;
one or more processors coupled to the memory device, the one or more processors configured to:
receive an indication from a user equipment (UE) that the UE supports, for different ones of a plurality of power modes supported by the UE, an enhanced microsleep mode wherein the enhanced microsleep mode enables the UE to enter a sleep mode for one or more transmission time intervals (TTIs) during which an absence of scheduling for the UE is guaranteed to the UE;

send an indication to the UE of the absence of scheduling for the UE for a preselected duration, wherein the indication of the absence of scheduling comprises the preselected duration; and cease, immediately after sending the scheduling indication, sending control information to the UE for the preselected duration.

33. The base station of claim 32, wherein the preselected duration corresponds to a duration of a preselected number of slots within a subframe.

34. The base station of claim 32, wherein the scheduling comprises semi-persistent scheduling.

35. The base station of claim 32, wherein the one or more processors configured to cease, immediately after sending the scheduling indication, sending control information to the UE for the preselected duration are configured to cease sending control channel information to the UE.

36. The base station of claim 32, wherein the one or more processors are further configured to receive an indication of a frame structure supported by the UE for a first power mode of the plurality of power modes supported by the UE.

37. The base station of claim 32, wherein the one or more processors are further configured to:
receive, from the UE prior to sending the indication to the UE of the absence of scheduling for the UE for the preselected duration, a minimum sleep duration of the UE; and determine the preselected duration such that the preselected duration is equal to or greater than the minimum sleep duration.

38. The base station of claim 32, wherein the one or more processors are further configured to:
send, to the UE after sending the indication to the UE of the absence of scheduling for the UE for the preselected duration, a request to transition the UE from a low power mode to a normal power mode, wherein the low power mode is associated with lower power consumption than the normal power mode; and receive an indication that the UE declined the request to transition the UE from the low power mode to the normal power mode.

* * * * *